United States Patent
Boul et al.

(10) Patent No.: US 10,302,799 B2
(45) Date of Patent: *May 28, 2019

(54) FLUID CHARACTERIZATION APPARATUS, SYSTEMS, AND METHODS

(71) Applicant: Halliburton Energy Services, Inc., Houston, TX (US)

(72) Inventors: Peter James Boul, Houston, TX (US); Randal Thomas Beste, Katy, TX (US); Jesse Kevin Hensarling, Cleveland, TX (US); Krishna M. Ravi, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 252 days.

This patent is subject to a terminal disclaimer.

(21) Appl. No.: 15/117,123

(22) PCT Filed: Jun. 24, 2014

(86) PCT No.: PCT/US2014/043917
§ 371 (c)(1),
(2) Date: Aug. 5, 2016

(87) PCT Pub. No.: WO2015/199661
PCT Pub. Date: Dec. 30, 2015

(65) Prior Publication Data
US 2017/0146680 A1    May 25, 2017

(51) Int. Cl.
*G01V 3/24* (2006.01)
*E21B 33/14* (2006.01)
(Continued)

(52) U.S. Cl.
CPC ............ *G01V 3/24* (2013.01); *E21B 33/14* (2013.01); *E21B 47/0005* (2013.01); *E21B 2043/0115* (2013.01)

(58) Field of Classification Search
CPC ....... G01V 3/24; E21B 33/14; E21B 47/0005; E21B 2043/0115
See application file for complete search history.

(56) References Cited

U.S. PATENT DOCUMENTS

| 7,581,434 B1 * | 9/2009 | Discenzo ........... G01N 33/2888 73/53.01 |
| 2002/0170341 A1 | 11/2002 | Jakoby et al. |

(Continued)

FOREIGN PATENT DOCUMENTS

| WO | WO-2013009251 A1 | 1/2013 |
| WO | WO-2015199661 A1 | 12/2015 |

OTHER PUBLICATIONS

Perini et al., "Electrochemical impedance spectroscopy for in situ petroleum analysis and water-in-oil emulsion characterization", Aug. 5, 2011, The Science and Technology of Fuel and Energy 91, pp. 224-228.*

(Continued)

*Primary Examiner* — David Z Huang
(74) *Attorney, Agent, or Firm* — Chamberlain Hrdlicka

(57) ABSTRACT

An apparatus and method may operate to position an electrode assembly within a fluid. The electrode assembly may include an injection electrode and a receiving electrode in spaced relation to one another. The method may include providing a series of excitation signals at a plurality of frequencies to the injection electrode to inject a series of injection signals into the fluid. The method can further include receiving signals in response to the series of injection signals through the receiving electrode. The received signals can be representative of an impedance spectrum including impedance values representative of the fluid. The method can further include generating a phase angle fingerprint based on the impedance spectrum to characterize the (Continued)

fluid according to the phase angle fingerprint. Additional apparatus, systems, and methods are disclosed.

18 Claims, 17 Drawing Sheets

(51) Int. Cl.
  E21B 47/00 (2012.01)
  E21B 43/01 (2006.01)

(56) References Cited

U.S. PATENT DOCUMENTS

| | | |
|---|---|---|
| 2005/0030034 A1 | 2/2005 | Ganesan |
| 2007/0224692 A1 | 9/2007 | Agar et al. |
| 2014/0062489 A1 | 3/2014 | Pindiprolu et al. |
| 2017/0131226 A1* | 5/2017 | Boul .................. G01V 3/20 |

OTHER PUBLICATIONS

"International Application Serial No. PCT/US2014/043917, International Search Report dated Mar. 27, 2015", 3 pgs.
"International Application Serial No. PCT/US2014/043917, Written Opinion dated Mar. 27, 2015", 10 pgs.

\* cited by examiner

FLUID CHARACTERIZATION APPARATUS, SYSTEMS, AND METHODS

PRIORITY APPLICATIONS

This application is a U.S. National Stage Filing under 35 U.S.C. § 371 from International Application No. PCT/US2014/043917, filed on Jun. 24, 2014, and published as WO 2015/199661 on Dec. 30, 2015, which application and publication are incorporated herein by reference in their entirety.

BACKGROUND

Understanding the structure and properties of geological formations is important for a wide variety of applications in well and reservoir management, monitoring, and remediation. Fluid sensing devices can detect certain properties of fluids to aid in attaining this understanding. Ongoing efforts are directed to development and use of fluid sensing devices that can monitor all fluids that are in place in a wellbore, including those put in place by operators, and those indicating the existence of an undesirable condition, such as contamination or invasion.

DETAILED DESCRIPTION

To address some of the challenges described above, as well as others, apparatuses, systems, and methods are described herein for using electrode-based fluid sensing components, in a laboratory environment and elsewhere, to characterize fluids according to impedance spectra generated in those fluids. For example, various methodologies and structures described herein can be used to capture and create libraries of phase angle fingerprints, each of which is generated using the impedance spectra. Libraries of phase angle fingerprints, as well as other impedance spectrum characteristics and values, can be used to identify fluids in the field, when downhole systems capture impedance measurements during and after wellbore operations, including cementation operations.

Figure 1:
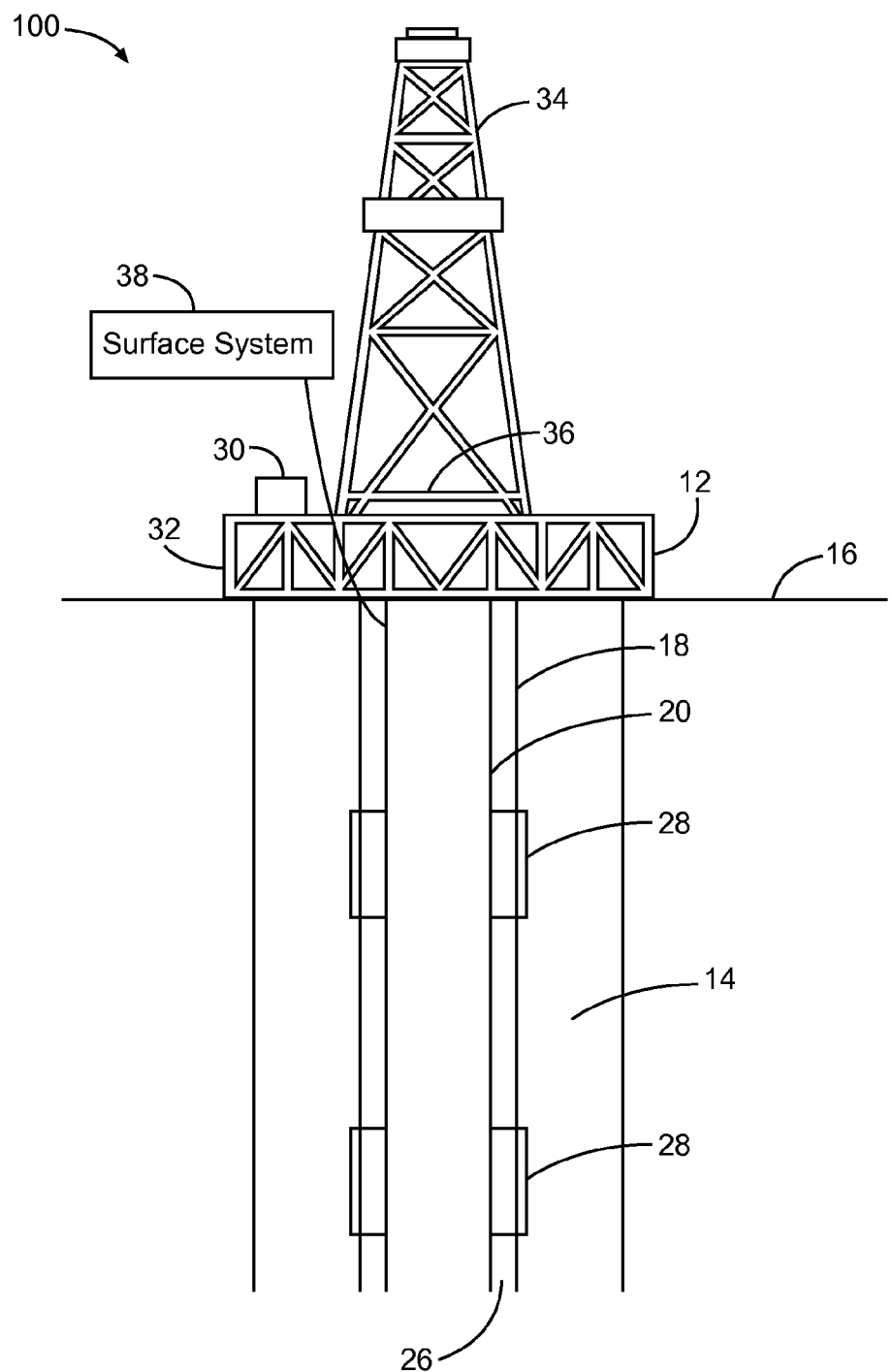
FIG. 1 illustrates a drilling system in which example embodiments can be implemented.

FIG. 1 illustrates a drilling system 100 in which example embodiments can be implemented. Drilling system 100 includes a drilling rig 12 centered over a subterranean oil or gas-bearing formation 14 located below the earth's surface 16. Rig 12 includes a base 32 and a derrick 34 supporting a hoisting apparatus 36 for raising and lowering pipe strings such as casing 20, and other equipment into a wellbore 18. One or more pumps 30 are arranged for pumping of a variety of wellbore fluids as may be used for various well operations (e.g., drilling mud, well control fluids, and cement or other sealants, etc.).

Well bore 18 has been drilled through the various earth strata, including formation 14. While wellbore 18 is shown as being drilled vertically, wellbore 18 can also be drilled horizontally. During well completion, casing 20 is placed in wellbore 18 to stabilize the well and to facilitate the production of oil and gas from formation 14. Casing 20 together with the formation sidewalls defining wellbore 18 define an annulus 26 surrounding casing 20.

Drilling mud or other fluids can initially be in place in annulus 26 to maintain pressure control of the well. "Cement" or another form of sealant is used to secure casing 20 in place and to isolate the formations penetrated by wellbore 18 from one another. In an example cementation process, cement slurry is pumped down the inside of casing 20. As the cement slurry reaches the bottom of casing 20, the cement slurry flows out of casing 20 and up through the annulus, displacing any fluid such as drilling mud in annulus 26. During spotting of the cement slurry, the cement can become contaminated with drilling mud or other fluids, and this contamination can have a negative impact on the curing and integrity of the cement.

In various example systems, different structure and methodologies use alternating current (AC) impedance spectroscopy (IS) to diagnose and to assess the health of the cement after placement. AC impedance sensors 28, when placed downhole, offer real-time feedback of the composition and integrity of the placed cement. As the placed cement cures, chemical reactions and changes in cement structure result in changes in measured impedance sensed by AC impedance sensors. Communication circuitry downhole transmits measured impedance values to a central processing unit, for example surface system 38, located at the wellhead. Surface system 38 or another processor can monitor the cure state and quality of cement in response to the changes in impedance measurements by comparing impedance measurements against sets of measurements that were previously captured in a laboratory or other environment.

Further, surface system 38 or another processor can perform fluid identification through impedance measurements. For example, the surface system 38 can identify drilling mud, spacer fluids, and other fluids, and the surface system 38 can distinguish these and other fluids from cement through examination of impedance spectra. Additionally, methods described later herein can distinguish uncontaminated cement from cement that has been contaminated by either drilling mud or spacer fluid.

Systems and Methods for Generating Impedance Spectra

In accordance with various embodiments, operators can conduct laboratory measurements to describe cement and other fluids according to impedance properties of the cement and other fluids. Surface system 38 can store data, such as AC spectroscopic impedance signatures, in remote or local data storage. Surface system 38 can retrieve and examine the saved data to determine properties of cement during the time that the cement is monitored by other sensors, described in more detail below, located on casing 20 within wellbore 18.

Figure 2:
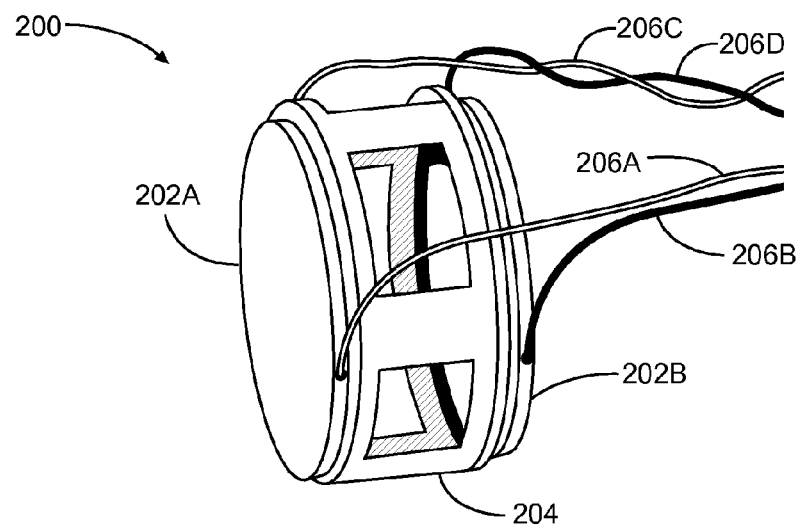
FIG. 2 depicts an example electrode system for use in an impedance measurement system for describing cement prior to pumping cement into a well.

FIG. 2 depicts an example electrode system 200 for use in an impedance measurement system (300 in FIG. 3) for describing cement prior to pumping cement into a well. By way of non-limiting example, the electrode system 200 can include two electrodes 202A and 202B. Electrodes 202A-B can be in the shape of discs although embodiments are not limited thereto. Electrodes 202A-B can include a metal such as stainless steel, and electrodes 202A-B can have dimensions including about a 2-inch diameter. Electrodes 202A-B each includes a facing surface to face the other electrode.

Electrodes 202A-B will attach to a spacer 204. Spacer 204, which can be manufactured through a variety of methods including 3-D printing, can separate electrodes 202A-B by about ½" such that the polished surfaces of electrodes 202A-B face each other. Spacer 204 can be printed with an acrylonitrile/butadiene/styrene (ABS) polymer in some embodiments. However, the material included in the spacer and its method of manufacture can include other materials based on criteria including cost, or on durability with respect to temperature, pressure, or chemical environments.

Wires electrically couple to electrodes 202A-B. In some embodiments, four wires 206A, 206B, 206C, and 206D are used. Wires 206A-D can be 24 American wire gauge (AWG) wires, and can be soldered with high melting point (HMP) solder onto electrodes 202A-B, although embodiments are not limited to any particular gauge or solder.

Figure 3:
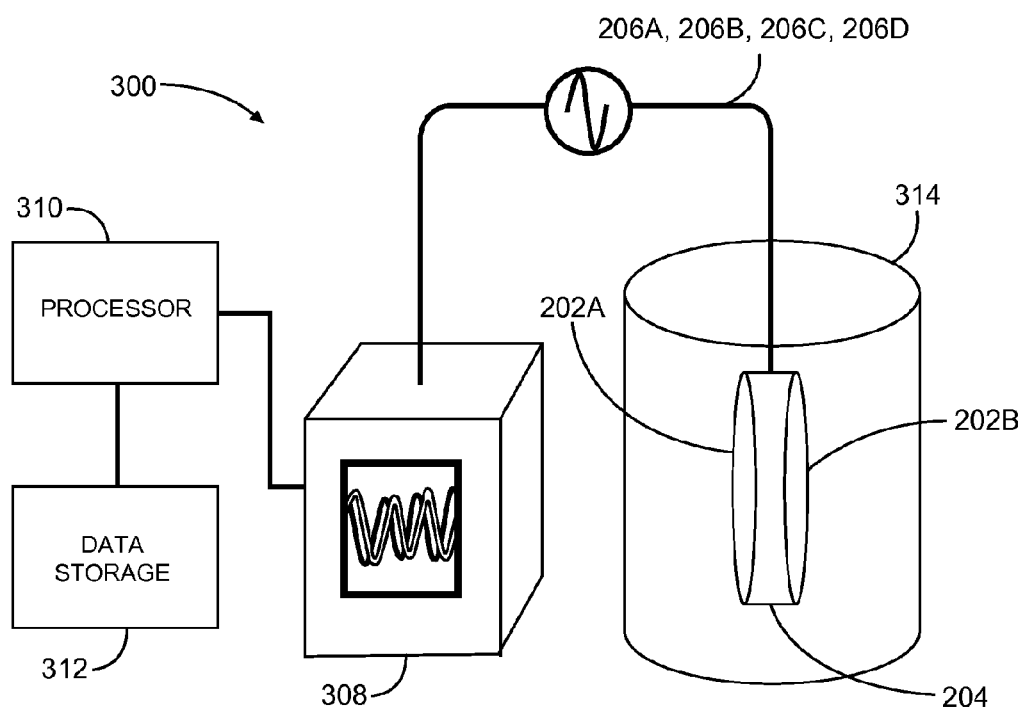
FIG. 3 depicts an impedance measurement system for measurement of impedance values of a fluid in accordance with some embodiments.

FIG. 3 depicts an impedance measurement system 300 for measurement of impedance values of a fluid in accordance with some embodiments. Components comparable to those discussed relative to FIG. 2 are numbered similarly in FIG. 3. The impedance measurement system 300 will use an impedance analyzer 308 (such as an Agilent 4294A impedance analyzer available from Agilent Technologies of Santa Clara, Calif.) to measure impedances of cement or other fluids prior to cement emplacement in wellbore 18, for example in an operator laboratory or other facility.

Figure 4A:
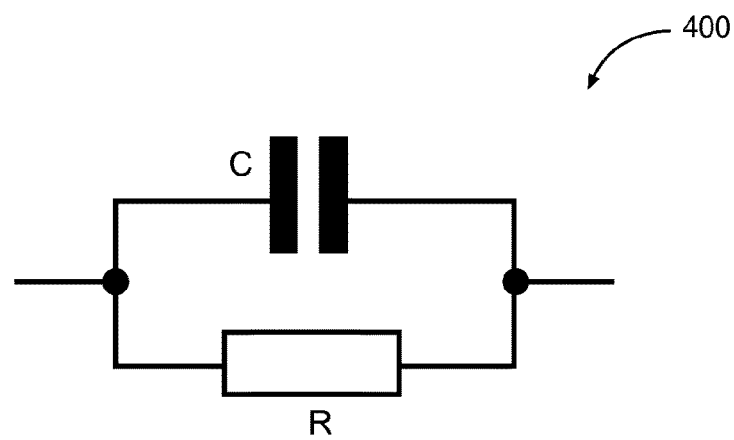
FIG. 4A depicts a model circuit that can represent impedance of an electrode-cement interface.

The resistance and capacitance of bulk cement and electrode contacts can be described with reference to equivalent circuit models of FIGS. 4A-B. Referring first to FIG. 4A, the impedances of bulk cement and electrode contacts are modeled as a parallel RC component 400. This modeling signifies that that the interface between the electrodes (202A-B in FIGS. 2 and 3) and the cement acts as a capacitor (e.g., a "contact capacitor"), in parallel with a resistor when an impedance analyzer (308 in FIG. 3) makes an impedance measurement. The contact capacitance will typically be very small, in the range of nano-farads (nF) or less, to overlap with the capacitance value resulting in the high frequency arc, described in more detail below regarding FIGS. 5A-5B, for hydrating cement systems. Therefore, the existence of the contact capacitor will be reflected in the impedance spectra in the high frequency range. However, if the contact capacitance is larger, for example in the microfarad range, signifying a larger contact area, the influence of the contact capacitance is not detected in the high frequency range.

Figure 4B:
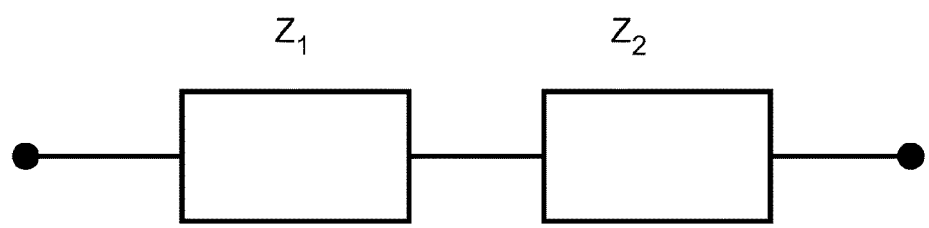
FIG. 4B depicts a model circuit that can represent impedances of bulk cement and electrode contacts.

Taken together, the resistance and capacitance of bulk cement and of the electrode contacts can be modeled as two impedances $Z_1$ and $Z_2$ in series as shown in FIG. 4B.

Referring again to FIG. 3, in embodiments, a signal generator applies an AC signal, at a range of frequencies, to electrodes 202A-B so that the AC signal passes through whatever cement or other fluids have been placed in container 314 with electrodes 202A-B. The signal generator can be incorporated in the impedance analyzer 308 or the signal generator can be separate from impedance analyzer 308. The frequency generator can provide an input signal in a frequency range of about 40 Hz to about 110 MHz. However, embodiments are not limited thereto. Wires 206A-D attach to impedance analyzer 308 to allow impedance analyzer 308 to capture four-point measurements of the impedance profile of the materials in the container 314 to which electrodes 202A-B were exposed. The impedance analyzer 308 or other sensor (not shown in FIG. 3) will determine current I through the materials in container 314, the potential difference V across the materials between two points, and the phase angle θ, all of which can be expressed according to Equations (1)-(2):

$$I = |I|e^{j\omega t} \quad (1)$$

$$V = |V|e^{j(\omega t + \theta)} \quad (2)$$

where ω is the angular frequency of the AC signal provided to electrodes 202A-B. |I| is typically a constant for a given cement specimen, |V| is sensed by sensors for sensing electrical potential, either incorporated in impedance analyzer 308 or separate sensors. Impedance analyzer 308 determines θ through comparison of the signal sensed by the potential sensors with the signal generated by the signal generator.

Real and imaginary components of impedance Z can be obtained according to Equations (3) and (4):

$$\text{Re}(Z) = \frac{|V|}{|I|}\cos\theta \quad (3)$$

$$\text{Im}(Z) = \frac{|V|}{|I|}\sin\theta \quad (4)$$

The processor 310, which can be local to the surface system 38 (FIG. 1), or remote from the surface system 38, will capture the four-point measurements of the impedance profiles and store at least some measurements in local or remote data storage 312.

In some embodiments, a system such as surface system 38 can analyze impedance data, captured using impedance analyzer 308, by analyzing Nyquist plots. As will be understood by those of ordinary skill in the art, Nyquist plots can be generated in accordance with some embodiments by making impedance gain and phase angle measurements as described above over a range of frequencies, and then plotting the imaginary and real components Re(z) and Im(Z) (Equations (3)-(4)) of the measurements. The processor 310 can also provide values to a display (not shown in FIG. 3) local or remote to the processor 310, to display the Nyquist plots or other graphical data representative of impedances.

Figure 5B:
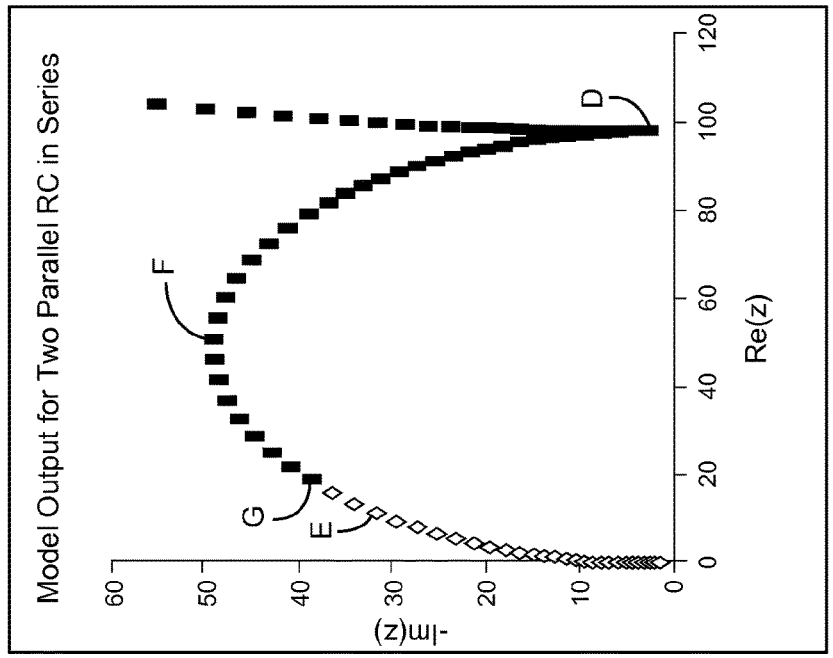
FIG. 5B illustrates a second example Nyquist plot using output impedance measurements taken using the circuit model of FIGS. 4A and 4B.
Figure 5A:
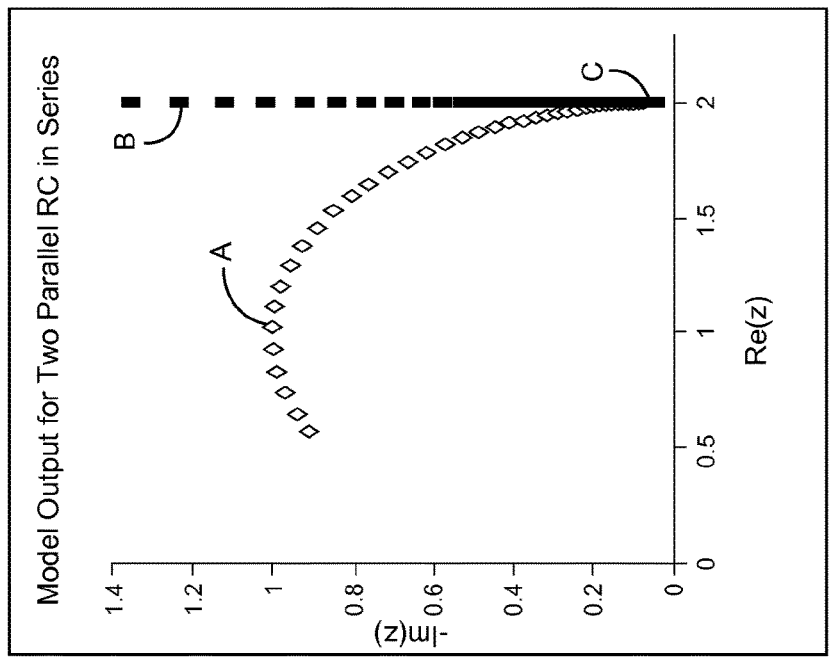
FIG. 5A illustrates a first example Nyquist plot using output impedance measurements taken using the circuit model of FIGS. 4A-B.

FIG. 5A illustrates an example Nyquist plot using output impedance measurements taken using the circuit model of FIGS. 4A-4B, when the bulk resistance of the fluid, for example cement, is equal to about 2 ohms. For example, FIG. 5A may illustrate a Nyquist plot of cement slurry, or liquid cement. The left-hand portion A is obtained by sweeping frequencies from 10 MHz to 90 MHz, and the horizontal portion B is obtained by sweeping from 290 Hz to 10 MHz. In the example of FIG. 5A with bulk resistance equal to 2 ohms, the measurement C at 10 MHz corresponds to the bulk resistance of the fluid (in this case cement slurry).

FIG. 5B illustrates a Nyquist plot using output impedance measurements taken using the circuit model of FIGS. 4A-B when the bulk resistance D of the fluid is equal to about 98 ohms. For example, FIG. 5B may illustrate a Nyquist plot of set or solidified cement. The left-hand portion of the semi-circle E on the left is obtained by sweeping frequencies from 10 MHz to 90 MHz, while the remainder F of the Nyquist plot is obtained by sweeping frequencies from 290 Hz to 10 MHz. As will be noted, the data point G taken at 10 MHz is on the bulk arc, which corresponds more to the dielectric properties of the material. This signifies that the frequency where the bulk resistance may be identified in the Nyquist plot is higher in a liquid slurry than in a set cement.

Figure 6:
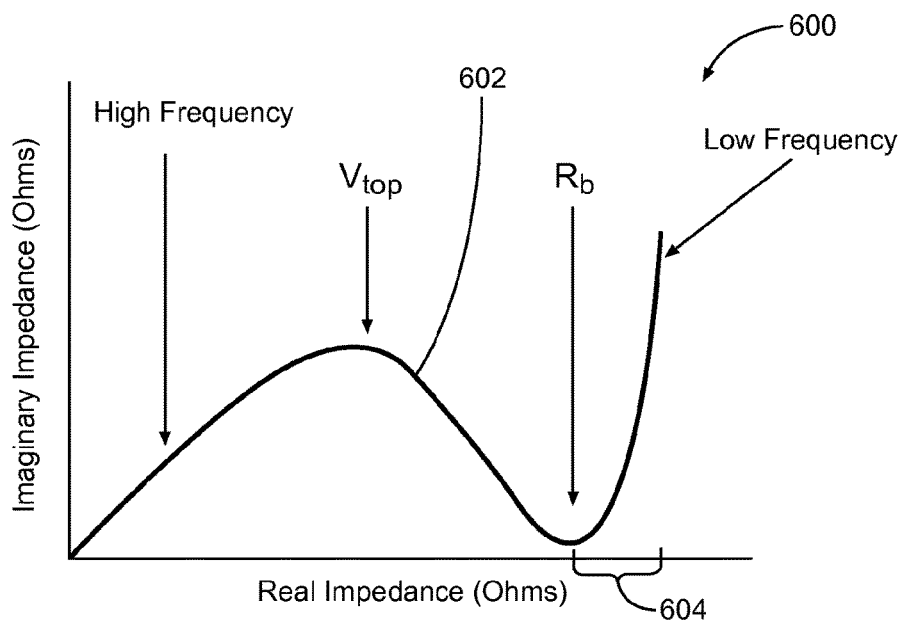
FIG. 6 illustrates a Nyquist plot using impedance measurements for cement generated in accordance with some embodiments.

FIG. 6 illustrates a Nyquist plot 600 for cement generated in accordance with some embodiments. $R_b$ is the bulk resistance of the cement. The portion 602 of the Nyquist plot can be attributed to a combination of the capacitance and the resistance of the cement. To the right of $R_b$, along the x-axis, is the RC component 604 associated with the polarization and contact resistance of electrodes 202A-B (FIG. 2). Accordingly, the portion 602 results from the bulk cement and the latter 604 from the cement-electrode interfaces. It will be appreciated that the frequency of each data point in Nyquist plot 600 decreases with increasing real impedance.

In embodiments that use AC IS, capacitive charging of the electrodes does not obscure the measurement of the bulk resistivity $R_b$. As was described earlier, this obscuring was particularly problematic for measurements of two-point DC resistivity. When Nyquist plots are generated for samples of a cement slurry as the cement slurry hydrates over time, the capacitance of the samples will be observed to change over time, and this change in capacitance as can be observed through examination of the bulk arc at higher frequency. The relation of the capacitance to the resistance, and the frequency dependence thereof, renders a useful phase angle fingerprint for the fluids and solid composite materials of placed in the casing/wellbore annulus.

Figure 7:
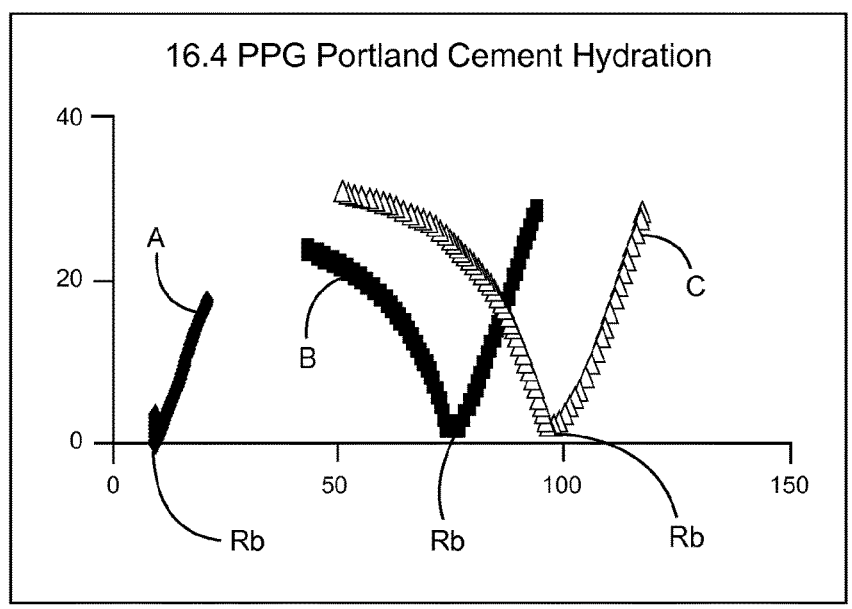
FIG. 7 depicts example impedance spectra of cement as measured at various times after cement emplacement in accordance with some embodiments.

FIG. 7 depicts example impedance spectra of cement as measured at various times after the start of cement hydration in accordance with some embodiments. Curve A represents an impedance spectrum at emplacement of the cement. Measurements of impedance in accordance with some embodiments, for example measurements of cement using an impedance measurement system 300 as described above regarding FIG. 3, indicate that the bulk resistance $R_b$ of the cement at start of cement hydration is about 10 ohms. Curve B represents an impedance spectrum 46 hours after start of cement hydration. Measurements of impedance in accordance with some embodiments indicate that the bulk resistance $R_b$ of the cement 46 hours after start of cement hydration is at about 70 ohms. Curve C represents an impedance spectrum 68 hours after the start of cement hydration. Measurements of impedance in accordance with some embodiments indicate that the bulk resistance $R_b$ of the cement 68 hours after the start of cement hydration is at about 100 ohms. As will be appreciated upon examination of the impedance spectra of FIG. 7, the bulk resistance $R_b$ of the cement increases as the cement hydrates.

Figure 8:
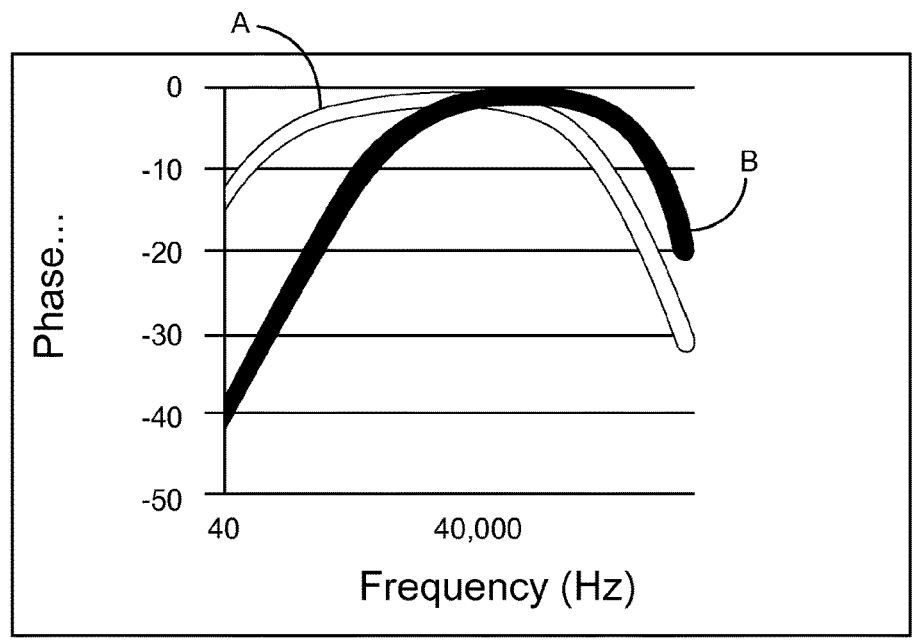
FIG. 8 illustrates example phase angle fingerprints for Portland cement prior to setting and after setting.

FIG. 8 illustrates example phase angle fingerprints for Portland cement prior to setting and after setting. As shown in FIG. 8, the phase angle ($\theta$ in equations (1)-(4) described earlier) between the sensed voltage and current signals, when graphed with respect to sweep frequency, contains a specific fingerprint for the cement slurry (curve A) and the set cement (curve B). A system, for example surface system 38 (FIG. 1) can use this phase angle fingerprint to distinguish fluids from one another. In particular, a cement slurry, set cement, tuned spacer fluid, and water-based mud will have different phase angle fingerprints when graphed relative to frequency. Structures and methodologies in accordance with various embodiments will compile and store a library of different phase angle fingerprints to be compared against phase angle fingerprints generated based on impedance measurements captured and measured by downhole fluid sensing components described later herein. The phase angle fingerprint will be fitted to a polynomial descriptor whereby the type of fluid is identified through a function. Values for the scalars in the function are identifiably specific to the fluid type and vary as according to the relation of reactance to real impedance as a function of alternating current frequency.

Figure 9:
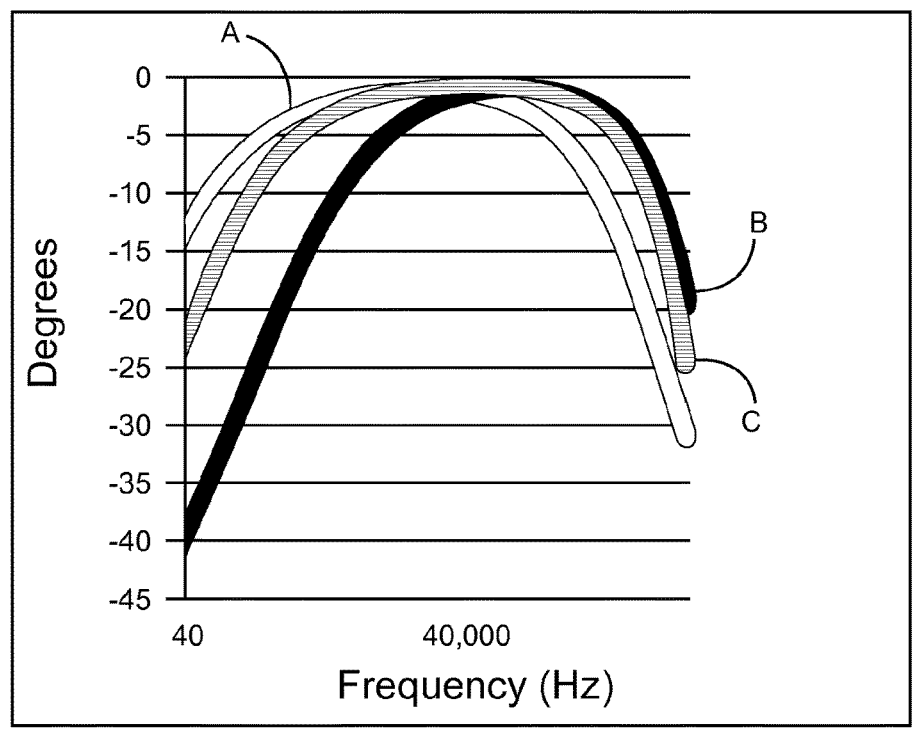
FIG. 9 illustrates example phase angle fingerprints for a tuned spacer fluid and for Portland cement prior to and after setting.

FIG. 9 illustrates example phase angle fingerprints for a tuned spacer fluid and for Portland cement prior to setting and after setting. As shown in FIG. 9, the phase angle ($\theta$ in equations (1)-(4) described earlier) between the sensed voltage and current signals, when graphed with respect to sweep frequency, contains a specific fingerprint for tuned spacer fluid (curve C) cement slurry (curve A) and the set cement (curve B). Drill mud, water-based mud, or other fluids will also have varying phase angle fingerprints. A system, for example surface system 38 (FIG. 1) can use phase angle fingerprints to distinguish fluids from one another. In particular, cement slurry, set cement, tuned spacer fluid, and water-based mud will have different phase angle fingerprints when graphed relative to frequency.

Figure 10:
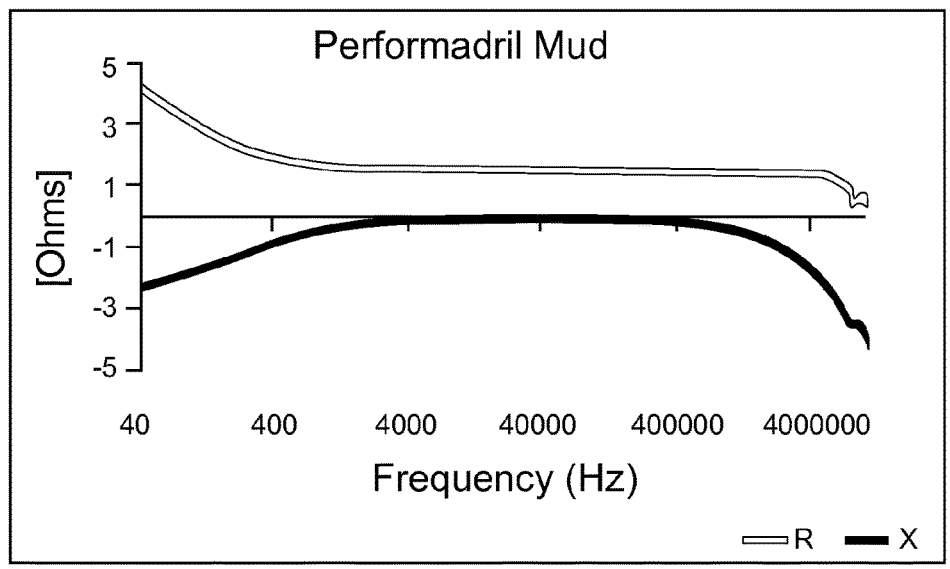
FIG. 10 illustrates reactance and resistance of a drilling mud as a function of frequency.

FIG. 10 illustrates reactance X and resistance R of a drilling mud analyzed as a function of frequency. It will be understood by those of ordinary skill in the art that FIG. 10 can also be converted into a Nyquist plot or Nyquist plots similar to those shown in FIGS. 5-7.

The example plot of FIG. 10 was created using Performadril® mud, which is available from Halliburton Company of Houston, Tex. However, similar plots or Nyquist plots, or other analysis can be performed in accordance with embodiments on any type of drilling mud or on other fluids. The example Performadril mud is a water-based drilling mud. To create the Performadril used for generating the example plot of FIG. 10, Performadril was blended at 4000 rpm in the order of (1) water, (2) sodium chloride, (3) barazan D, (4) Clayseal® Plus, which is available from Halliburton Company of Houston, Tex., (5) PAC R, and (6) Dextrid E. After the addition of Dextrid E, the remaining components (Clayseal® Plus; Performatrol®, Baroid®, and Barabuf®, all available from Halliburton Company of Houston, Tex.) were added and the slurry was blended at 12,000 rpm for 5 minutes. AC IS as described earlier herein was conducted by sweeping from 40 Hz to 5 MHz. Accordingly, the example Performadril mud that was used for generating the example plot of FIG. 10 includes the following composition. However, it will be understood that similar plots can be created for drilling mud or other fluids:

| Material | Amount (grams) | Density (g/cc) |
| --- | --- | --- |
| Water | 276.74 | |
| NaCl | 15.04 | 2.165 |
| Barazan D Plus | 1.25 | 1.6 |
| PAC R | 1 | 1.6 |
| Dextrid E | 2 | 1.5 |
| Clayseal Plus | 3.5 | 1.0261-1.0561 |
| Performatrol | 6 | 1.03 |
| Baroid | 240.2 | 4.35 |
| Barabuf | 0.25 | |

Figure 11:
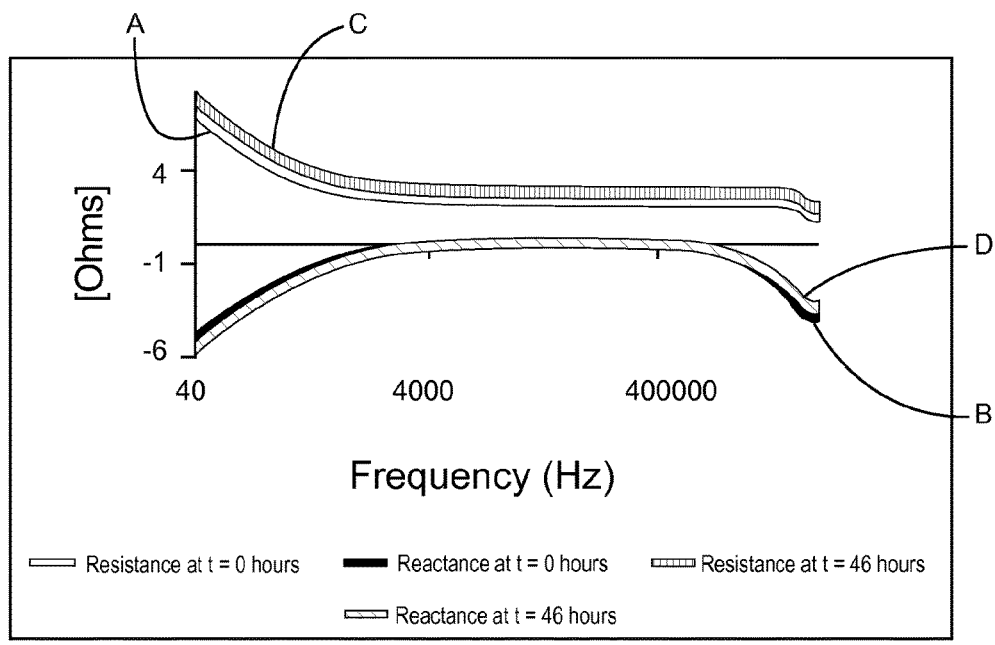
FIG. 11 illustrates a reactance and resistance diagram that further depicts time dependency of reactance and resistance when the Performadril mud contaminates cement.

FIG. 11 illustrates a reactance and resistance diagram that further depicts time dependency of reactance and resistance when the Performadril mud contaminates cement. It will be understood by those of ordinary skill in the art that FIG. 11 can also be converted into a Nyquist plot or Nyquist plots similar to those shown in FIGS. 5-7. Curve A illustrates resistance of contaminated cement at the time that Performadril mud was added as a contaminating layer, and curve B illustrates reactance of contaminated cement at the time that Performadril mud was added as a contaminating layer. Curve C illustrates resistance of contaminated cement 46 hours after the time that Performadril mud was added as a contaminating layer. Curve D illustrates reactance of contaminated cement 46 hours after the time that Performadril mud was added as a contaminating layer.

Figure 12:
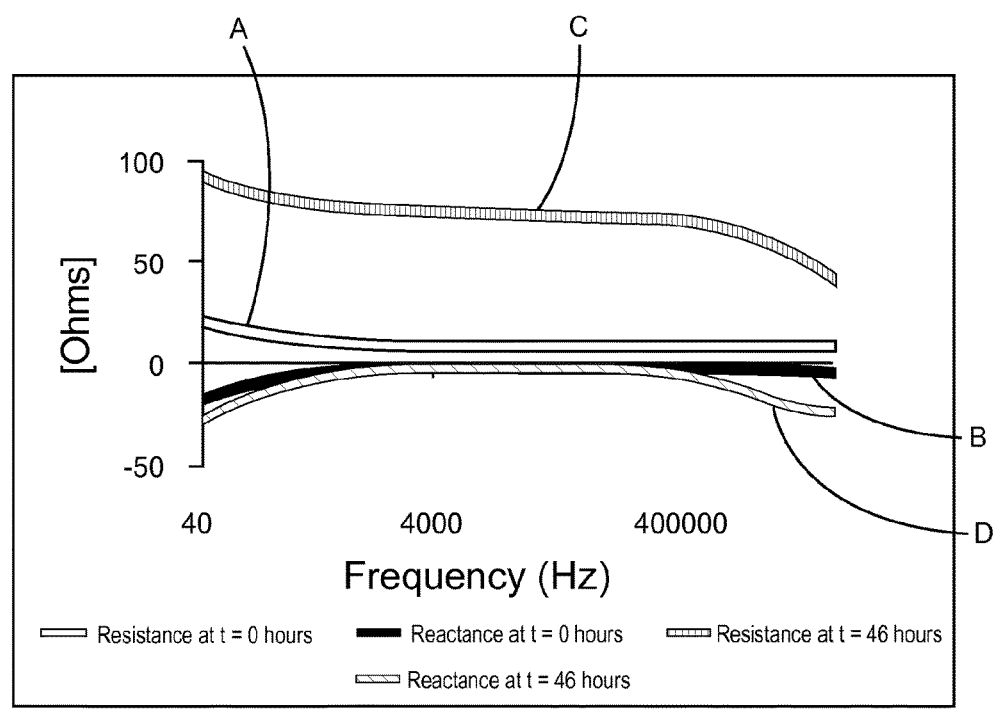
FIG. 12 illustrates a reactance and resistance diagram that further depicts time dependency of reactance and resistance in uncontaminated cement.

In contrast, FIG. 12 illustrates a reactance and resistance diagram that further depicts time dependency of reactance and resistance of uncontaminated cement. It will be understood by those of ordinary skill in the art that FIG. 12 can also be converted into a Nyquist plot or Nyquist plots similar to those shown in FIGS. 5-7. Curve A illustrates resistance of uncontaminated 16.4 parts per gallon (ppg) Portland cement at the start of hydration, and curve B illustrates reactance of uncontaminated 16.4 ppg Portland cement at the start of hydration. Curve C illustrates resistance of uncontaminated 16.4 ppg Portland cement 46 hours after start of hydration. Curve D illustrates reactance of uncontaminated 16.4 ppg Portland cement 46 hours after start of hydration. As will be appreciated upon comparing FIGS. 11 and 12, the curves A and C are more distinct in FIG. 12, and therefore the hydration state of uncontaminated cement is more easily determined compared to the hydration state of contaminated cement.

Figure 13:
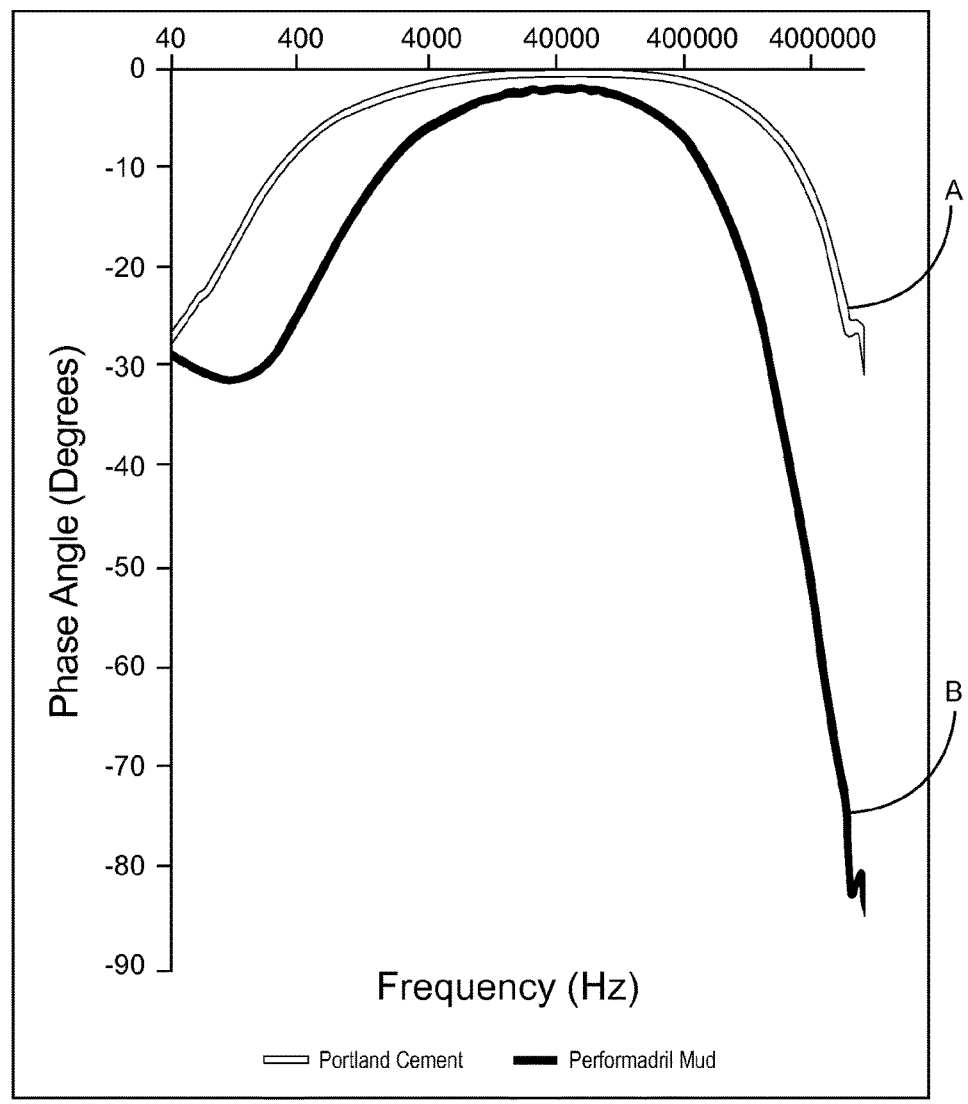
FIG. 13 illustrates example phase angle fingerprints for cement and drilling mud measured in accordance with some embodiments.

FIG. 13 illustrates example phase angle fingerprints for cement (curve A) and drilling mud (curve B) measured in accordance with some embodiments. As will be noted, the phase angle fingerprints are distinct from each other and therefore systems such as surface system 38 can distinguish mud from cement using the phase angle fingerprints measured or calculated in accordance with some embodiments described earlier herein. For example, as described earlier herein regarding FIG. 8, the phase angle fingerprint will be fitted to a polynomial descriptor whereby the type of fluid is identified through a function. Values for the scalars in the function are identifiably specific to the fluid type and vary as according to the relation of reactance to real impedance as a function of alternating current frequency.

Figure 14:
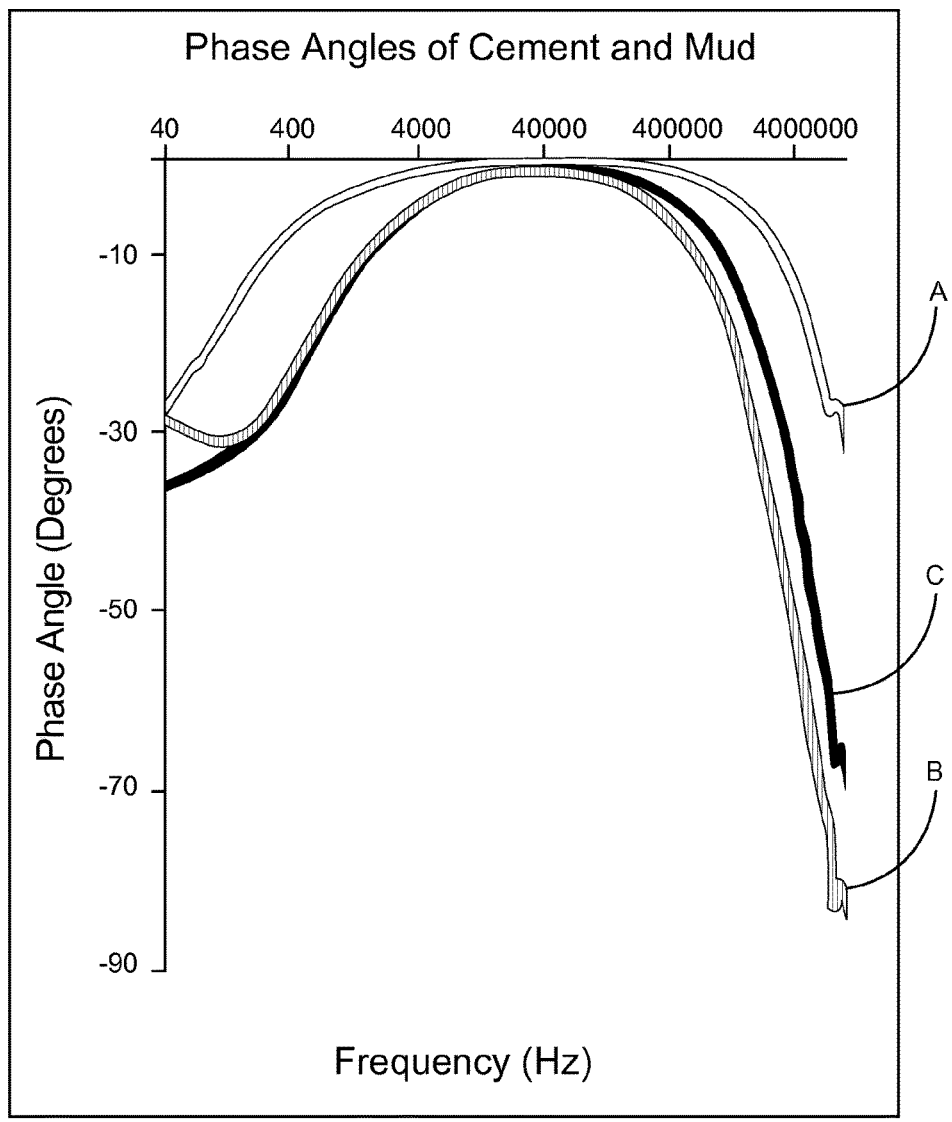
FIG. 14 illustrates example phase angle fingerprints for cement, drilling mud and contaminated cement measured in accordance with some embodiments.

FIG. 14 illustrates example phase angle fingerprints for cement (curve A), a drilling mud such as Performadril mud (curve B) and contaminated cement (curve C) measured in accordance with some embodiments. As will be noted, the phase angle fingerprints are distinct from each other and therefore systems such as surface system 38 can distinguish mud, cement, and contaminated cement using the phase angle fingerprints measured or calculated in accordance with some embodiments described earlier herein.

Figure 15:
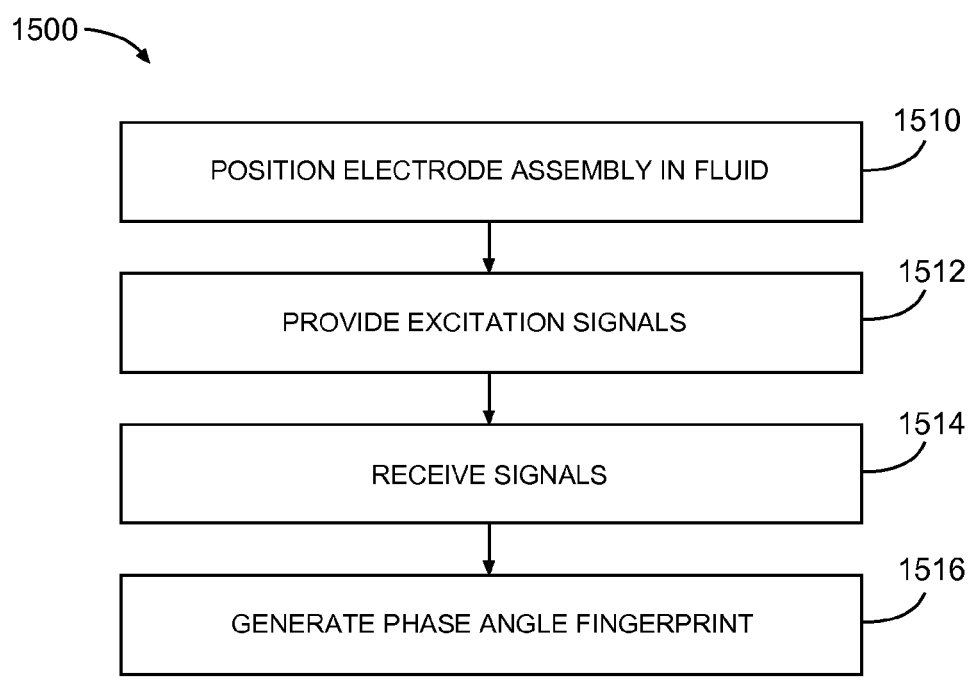
FIG. 15 depicts a flow chart of an example method for characterizing fluids based on impedance spectra in accordance with some embodiments.

FIG. 15 depicts a flow chart of an example method 1500 for characterizing fluids based on impedance spectra in accordance with some embodiments. A system such as the impedance measurement system 300 (FIG. 3) can perform some operations of example method 1500.

In operation 1510, an electrode assembly is positioned within a fluid. As described earlier herein regarding FIG. 3, the electrode assembly will be placed in fluid in container 314, and the electrode assembly will include electrodes 202A-B (e.g., an injection electrode and a receiving electrode) in spaced relation to one another.

The example method 1500 continues at operation 1512, with providing a first series of excitation signals at a first plurality of frequencies to the injection electrode 202A or 202B to inject a first series of injection signals into the first fluid. A signal generator (e.g., incorporated in impedance analyzer 308 of FIG. 3) will provide the first series of excitation signals. A processor (e.g., processor 310 of FIG. 3) can select a frequency range to be used for the first plurality of frequencies based on expected properties of the fluid in container 314 proximate electrodes 202A and 202B, or the processor 310 can select frequencies based on capacitance or other predicted electrical parameters generated using the models of FIGS. 4A-4B. As described earlier herein, the fluid can be selected from a group including a cement-based fluid, a drill fluid, and a spacer fluid, although embodiments are not limited to any particular fluid.

The example method 1500 continues at operation 1514 with receiving signals in response to the series of injection signals through the receiving electrode 202A or 202B. The received signals will be representative of an impedance spectrum including impedance values representative of the fluid in container 314 as described earlier herein regarding Equations (1)-(4).

The example method 1500 continues at operation 1516 with generating, by the processor 310 or other system such as surface system 38, a phase angle fingerprint based on the impedance spectrum to characterize the fluid according to the first phase angle fingerprint. Other characteristics can be observed, or calculations can be performed as described earlier herein regarding Equations (1)-(4) and FIGS. 2-14, including but not limited to calculations of bulk resistance values, reactance, resistance, dielectric constants, etc. The processor 310 can store these or other values in, for example a relational database or other type of database, in data storage 312 such that the values are linked relationally to corresponding fluids or mixtures of fluids. The surface system 38 or other processor can then use these stored values, upon receiving downhole measurements as described in more detail below, to compare stored values against received measurements to detect identity of fluids, hydration state, etc.

The example method 1500 can be executed any number of times, using any fluid described earlier herein regarding FIGS. 2-14, or any combination of fluids separated into a fluid layer and a contamination layer, or otherwise chemically mixed or blended. As described earlier herein, when the fluid is a cement-based fluid, the processor 310 can identify a hydration state of the fluid based on the impedance spectra. During subsequent frequency sweeps, a signal generator can provide additional series of excitation signals to the injection electrode 202A or 202B to inject additional series of injection signals into the fluid. The frequency range to be used for each sweep of frequencies can be based on any criteria including the identity of the fluid, the time duration between each frequency sweep, expected or actual hydration state of cement at the times of any or all of the frequency sweeps, or any other criteria. The processor 310 can select the time interval between each frequency sweep based on expected hydration state of the cement, for example, or on other criteria.

Systems and Methods for Fluid Discrimination Using Impedance Spectra

As describe above regarding FIGS. 1-15, a system such as surface system 38 (FIG. 1) can use AC IS to capture impedance measurements and to generate and analyze Nyquist plots. As described earlier herein regarding FIG. 7, the bulk resistance $R_b$ of cement increases as the cement hydrates. The tortuosity and connectivity of the cement pore structure increases overtime causing an increase in the bulk resistance $R_b$ of the cement. Systems, for example surface system 38 (FIG. 1), can predict the permeability and diffusivity of the cement through use of the measurements for bulk resistance. Furthermore, systems can distinguish cement from other fluids, and systems can detect cement contamination, using impedance spectra or data related to impedance spectra that has been captured and saved to data storage as described earlier herein. The surface system 38 can receive impedance measurements for analysis from fluid sensing components that the operator has mounted to the casing 20 when the casing 20 is placed downhole.

Figure 16:
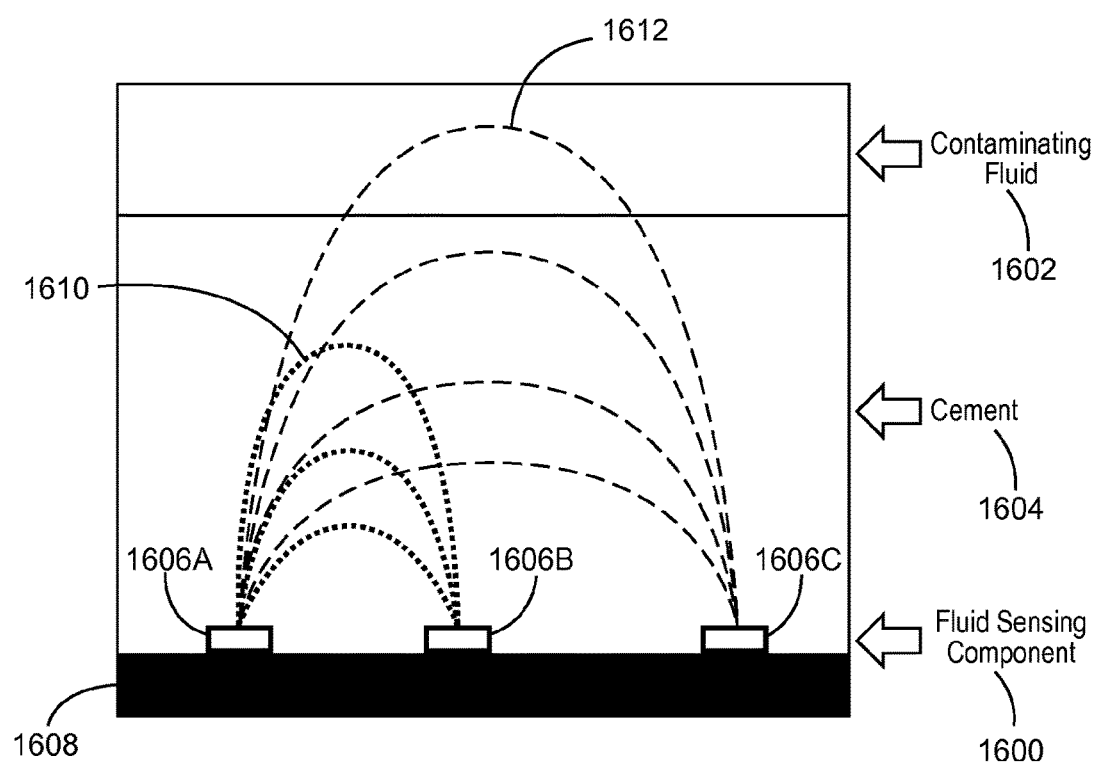
FIG. 16 depicts a side view of an example fluid sensing component as can be used to measure impedance spectra in accordance with some embodiments.

FIG. 16 depicts a side view of an example fluid sensing component 1600 as can be used to measure the cement (or other well-servicing fluids(s)) present within annulus 26 by measuring electrical impedance in accordance with some embodiments when the fluid sensing component 1600 is included on a communication assembly or casing 20 portion placed downhole.

Fluid sensing component 1600 includes electrodes 1606A-C mounted on an insulating base 1608 to prevent shorts against metallic surfaces, such as the body member of a communication assembly (as described below, referring to FIGS. 20-21 or a supporting section of casing 20 (FIG. 1). Materials including Protech DRB™ material or Protech CRB™ material, available from the Halliburton Company of Houston, Tex. can provide a suitable insulating base 1608. Electrodes 1606A-C can be placed on insulating base 1608 in various shapes, such as conductive strips, concentric loops etc. Each electrode 1606A-C can be in the form of a solid component (for example, metal plates or strips) secured to insulating base 1608, or, in other examples, can be formed of a coating metallized, or otherwise deposited, onto insulating base 1608.

In various example systems, structures and methodologies as described herein can provide variable depth sensing of a contaminating fluid 1602 in contact with set oil well cement 1604 but not in contact with the fluid sensing component 1600 itself. The spacing of electrodes 1606A-C of fluid sensing component 1600 allows for the variable depth of penetration of electric field lines. For example, electric field lines 1610, generated between electrodes 1606A and 1606B by providing excitation signals to one of electrodes 1606A and 1606B, may penetrate only into cement 1604. In contrast, electric field lines 1612, generated between electrodes 1606A and 1606C by providing excitation signals to one of electrodes 1606A and 1606C, may penetrate further into cement layer and, in some cases, into contaminating fluid 1602.

The relative placement, geometric configuration, and other design parameters of electrodes 1606A-C can be adjusted to improve the likelihood of detection of changes in the dielectric environment resulting from changes in the surrounding fluids. For example, the electrodes 1606A-C can be positioned nearer to each other for greater sensitivity to changes nearer to fluid sensing component 1600. Conversely, electrodes 1606A-C can be positioned further away from each other for greater sensitivity to changes further away from fluid sensing component 1600. In some embodiments, electrodes 1606A-C can be spaced from each other in a symmetrical arrangement, for example, electrode 1606A can be spaced at about a same distance from electrode 1606B as electrode 1606C is spaced from electrode 1606B. In other embodiments, electrodes 1606A-C can be spaced asymmetrically from each other. For example, electrode 1606A can be spaced about ½ inch from electrode 1606B and electrode 1606B can be spaced about one inch from electrode 1606C. Embodiments are not limited to any particular spacing, however. Operators can determine appropriate electrode spacing to provide comparative measurements of impedance at various distances from a communication assembly. Electrode spacing can also be determined based on, for example, power requirements, expected types of substances and fluids downhole, and surface areas of electrodes 1606A-C, among other factors.

In some embodiments, fluid sensing component 1600 can include two or more electrodes arranged as parallel plates, similarly to the parallel plates described earlier herein regarding FIG. 3. In at least these embodiments, the parallel plates can be separated using a spacer, and the space between the parallel plates can include a ceramic or resin material.

In some embodiments, electrodes 1606A-C will be directly exposed to the surrounding environment, for example to cement 1604 as can be present in annulus 26 (FIG. 1). In at least these embodiments, electrodes 1606A-C will be in direct contact with cement 1604 or any other fluids in annulus 26. In at least those embodiments for which electrodes 1606A-C are in direct contact with wellbore fluids, electrodes 1606A-C may couple galvanically or capacitively with fluids in the annulus. In embodiments for which electrodes 1606A-C couple galvanically with fluids in the annulus, electrodes 1606A-C can include a corrosion resistant metal (e.g., stainless steel) to reduce or eliminate the possibility that electrodes 1606A-C generate corrosion-related defects in the cement during the monitoring period.

In embodiments for which electrodes 1606A-C couple capacitively with fluids in the annulus, electrodes 1606A-C can include a metal (e.g., titanium). In some situations, the metal can oxidize to form a thin self-healing, electrically insulating, chemically inert, abrasive resistant chemical barrier (e.g., titanium oxide) for improved reliability of electrodes.

In other embodiments, a protective layer (not shown in FIG. 16) can be disposed over electrodes 1606A, 1606B, and 1606C to insulate them from well fluids and to provide abrasive resistance for electrodes 1606A, 1606B, 1606C. This barrier can include a ceramic or epoxy resin. In at least these embodiments, electrodes 1606A, 1606B, 1606C will not be in direct contact with the fluids. In at least these embodiments, electrodes 1606A, 16066, 1606C will couple capacitively with the fluids.

In order to generate impedance spectra similar to those described above as being generated in a laboratory environment, one or more of the electrodes 1606A-C (e.g., an "injection electrode") can receive a series of excitation signals in a frequency sweep including relatively low frequencies, for example in a range of about 40 Hz to 10 MHz. A signal generator (such as VCO 1932, FIG. 19) can provide these series of excitation signals. In response, the injection electrode will inject current into the surrounding environment, such as into cement 1604 (as an example fluid) or further into the surrounding environment, such as into contaminating fluid 1602. One or more other electrodes 1606A-C (e.g., a "receiving electrode") can receive the injected current. A processor or other system, for example, surface system 38, or another processor, can calculate impedance spectra to generate Nyquist plots, phase angle fingerprints, etc., as described earlier regarding FIGS. 1-14, and Equations (3)-(4).

Figure 17:
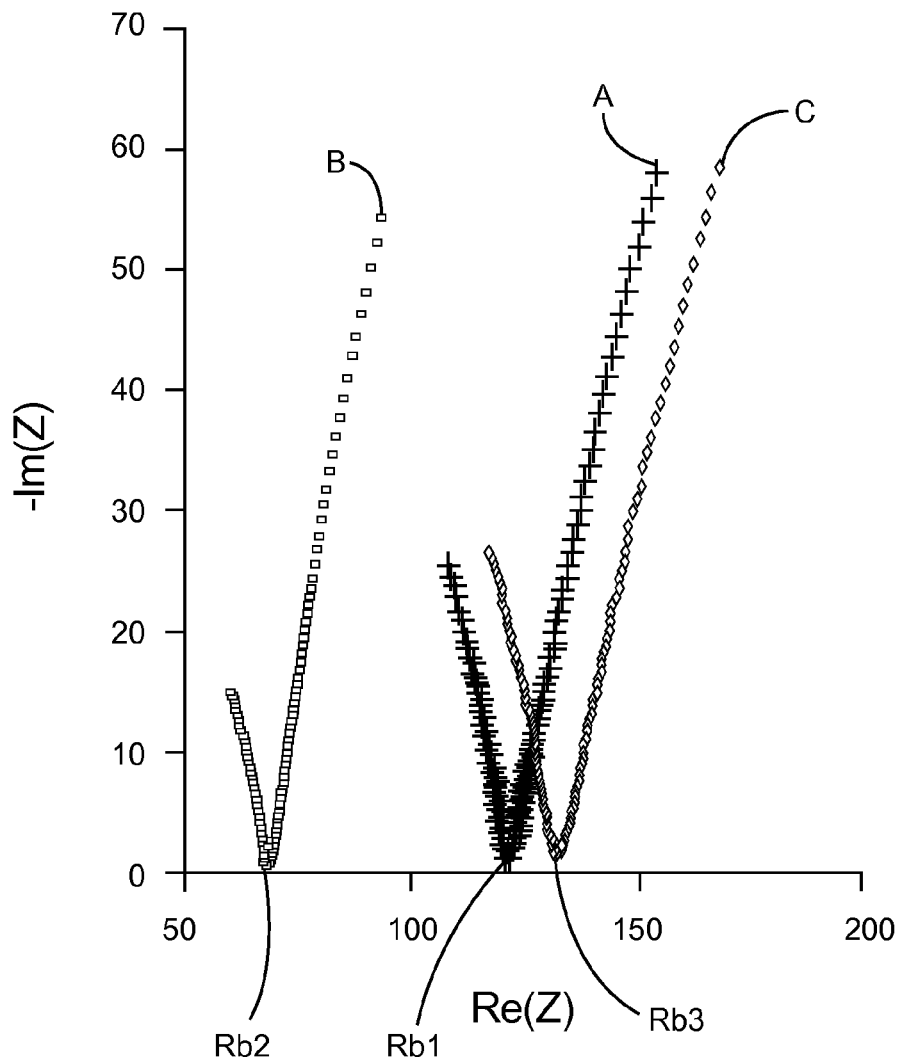
FIG. 17 illustrates example AC impedance spectra generated based on an impedance response between a first pair of electrodes in accordance with some embodiments.

FIG. 17 illustrates example AC impedance spectra generated based on an impedance response between electrodes 1606A and 1606C in accordance with various embodiments. Impedance spectra can be the same or substantially similar as impedance spectra described earlier herein regarding FIGS. 1-14. The example AC impedance spectra in FIG. 17 were generated by providing excitation signals at frequencies of 40 Hz to 4 MHz to an injection electrode such that injection currents passed through set cement, with a contaminating fluid layer including de-ionized water (curve A), 1.0 M potassium chloride solution (curve B), and an oil-based mud (curve C). However, impedance spectra can also be generated as described earlier herein using an unset cement slurry, or with no contamination of the set or unset cement, or with other contaminating fluids.

It will be appreciated by those of ordinary skill in the art that phase angle fingerprints, as described earlier herein regarding FIGS. 8-9 and 13-14, can be calculated or otherwise generated for further analysis and fluid discrimination functionalities. The discrimination of these functionalities can be realized analytically through polynomial curve fit parameters of the corresponding phase angle spectra.

As will be appreciated upon examination of FIG. 17, electrodes 1606A and 1606C will sense different values for characteristics of impedance spectra when different contaminating fluids impinge on cement. For example, bulk resistance Rb1 can be detected when the contaminating layer is de-ionized water, Rb2 can be detected when the contaminating layer is 1.0 M potassium chloride solution, and bulk resistance Rb3 can be detected when the contaminating layer is oil-based mud. Even though electrodes 1606A and 1606C were not in direct contact with the respective contaminating fluids, the bulk resistance measured changed as a function of the conductivity of the contaminating fluid layer.

Figure 18:
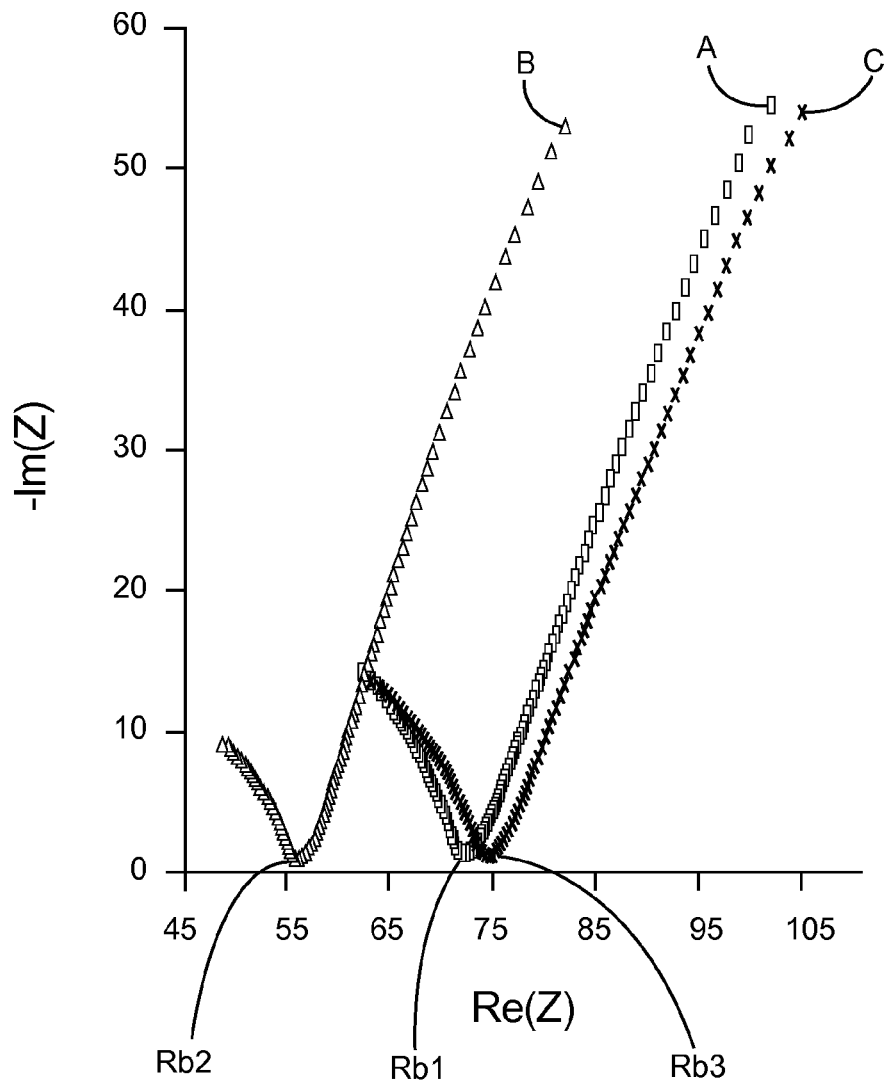
FIG. 18 illustrates example AC impedance spectra generated based on an impedance response between a second pair of electrodes in accordance with some embodiments.

FIG. 18 illustrates example AC impedance spectra generated based on an impedance response between electrodes 1606A and 1606B in accordance with various embodiments. Impedance spectra can be the same or substantially similar as impedance spectra described earlier herein regarding FIGS. 1-14. Similarly to the example AC impedance spectra of FIG. 17, the example AC impedance spectra in FIG. 17 were generated by providing excitation signals at frequencies of 40 Hz to 4 MHz to an injection electrode. In response, injection currents were passed through set cement with a contaminating fluid layer including de-ionized water (curve A), 1.0 M potassium chloride solution (curve B), and an oil-based mud (curve C). However, impedance spectra can also be generated as described earlier herein using an unset cement slurry, or with no contamination of the set or unset cement, or with other contaminating fluids.

Similarly to FIG. 17, electrodes 1606A and 1606B will sense different impedances when different contaminating fluids impinge on cement. For example, bulk resistance Rb1 can be detected when the contaminating layer is de-ionized water, Rb2 can be detected when the contaminating layer is 1.0 M potassium chloride solution, and bulk resistance Rb3 can be detected when the contaminating layer is oil-based mud. Even though electrodes 1606A and 1606B were not in direct contact with the respective contaminating fluids, the bulk resistance measured changed as a function of the conductivity of the contaminating fluid layer.

However, it will be noted upon comparing FIG. 17 and FIG. 18 that electrodes 1606A and 1606C generate different impedance spectra than electrodes 1606A and 1606B. In particular, the electrode pair 1606A and 1606C (FIG. 17) gave greater resolution in the differences between the contaminating fluid layers, due at least in part to the greater penetration of the electric field lines 1610 caused by the greater distance between electrodes 1606A and 1606C, as depicted in FIG. 16.

Accordingly, embodiments implementing fluid sensing components 1600 provide the ability to sense the distance of a contaminating fluid layer from the electrode pair 1606A and 1606C and from the electrode 1606A and 1606B. In some embodiments, the electric field lines can extend 12-18 inches into the wellbore or formation. Further due to this capability, structures and methodologies as described herein can diagnosis breaches in cement integrity by detecting contaminating fluids 1602.

Figure 19:
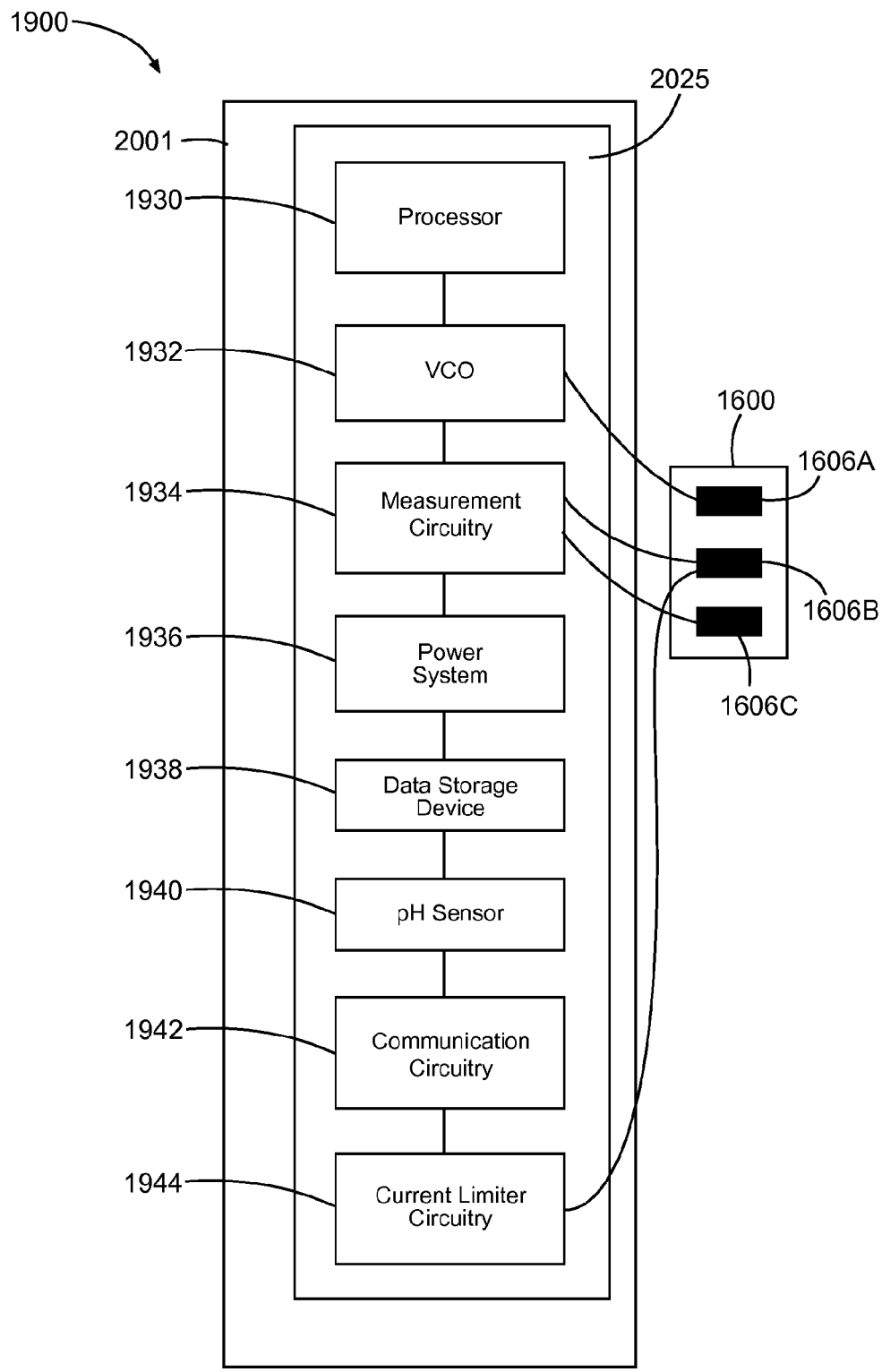
FIG. 19 depicts a schematic view of an example electronics assembly for performing functions of various embodiments.

FIG. 19 depicts a schematic view of an example electronics assembly 1900 that will perform functions of various embodiments. Electronics assembly 1900 provides excitation signals as described regarding FIGS. 15-17, and electronics assembly 1900 measures voltages and currents such as those described with reference to Equations (1) and (2) for use in calculating impedance spectra as described with reference to Equations (3)-(4) and FIGS. 6-14.

In various embodiments, one or more components of electronics assembly 1900 shown in FIG. 19 will be housed in rib 2001 or tube 2025 in a communication assembly (discussed later herein in reference to 2000 in FIG. 20). In the depicted example of electronics assembly 1900, the assembly includes one or more processors 1930 and a variable frequency generator to provide excitation signals to one or more of electrodes 1606A-C. In this example, the variable frequency generator is a voltage-controlled oscillator (VCO) 1932; but other forms of generators may provide the excitation signals, such as a dedicated integrated circuit (IC) and related circuitry.

Measurement circuitry 1934 couples to one or more of electrodes 1606A-C, to receive measure electrical parameters such as voltage and current resulting from passage of the excitation signals through the fluid and other materials in the well annulus 26.

Processor(s) 1930 control the operation of VCO 1932 and of measurement circuitry 1934. For example, processor(s) 1930 can control VCO 1932 according to properties of the fluid in the borehole, the amount of time that has elapsed since the fluid was placed in the borehole, etc. Processor(s) 1930 additionally process received signals, as described elsewhere herein. In some example systems, one or more processors may be dedicated to the functionality associated with measurement circuitry 1934. Where electronics assembly 1900 does all processing, each fluid-sensing component 1600 will typically consist primarily of a plurality of electrodes in electrical communication with electronics assembly 1900, with all other functionality provided by electronics assembly 1900.

Any one or more processors 1930 and/or measurement circuitry 1934 will typically be coupled to a data storage device 1938 for either temporary or continued storage of instructions, data, etc. Other components of electronics assembly 1900 can couple to the data storage device 1938 as desired for a specific implementation. The data storage device 1938 may be any form of electrical storage mechanism, and in most examples will include one or more of volatile or nonvolatile memory, including one or more of DRAM, SRAM, Flash, MRAM, and combinations of any of the foregoing, as well as other known forms of memory devices. For purposes of the present disclosure, any such storage mechanism, whether volatile or nonvolatile memory shall be considered a non-transitory storage device (or memory).

Electronics assembly 1900 also includes a power system 1936 configured to supply power at least in the electronics assembly 1900, and in many cases to the entire communication assembly (as discussed at 2000, in FIG. 20), with which it is associated. In many examples, power system 1936 will include one or more batteries. Power system 1936 may provide power, on the order of about 10 milliwatts to 200 milliwatts, for each iteration of series of excitation signals. Processor 1930 can control power system 1936 to operate communication assembly for a time duration sufficient for monitoring fluids throughout, for example, a curing process. To provide enhanced power efficiencies, processor 1930 can awaken communication assembly 2000 from a sleep state based on, for example, a pH change detected by pH sensor 1940.

Example electronics assembly 1900 will often also include communication circuitry 1942 to enable communication with an external location, as described elsewhere herein. Electronics assembly 1900 can transmit, receive, process, and telemeter EM signals to a central processing unit located at the surfaces. Example electronics assembly 1900 will often also include current limiter circuitry 1944 to suppress currents from being injected from at least one electrode of electrodes 1606A-C.

Processor(s) 1930 will evaluate signals received at one of electrodes 1606A-C to generate an impedance spectrum representative of an impedance between electrodes 1606A-C. Processor(s) 1930 will then evaluate the fluid in the borehole annulus through use of the impedance spectrum to determine fluid identities, contamination, and other parameters or conditions based on calculations of impedance spectra described earlier herein regarding FIGS. 6-14.

Alternatively or in addition, the processor(s) 1930 can telemeter relevant measurements to a surface system 38 (FIG. 1) or other system so that the surface system 38 or other system can perform fluid identification, display impedance spectra, or otherwise process impedance measurements. For power-saving purposes, the processor(s) 1930 may refrain from telemetering at least some data. For example, if measured impedance spectra or fluid characteristics are within an expected range, the processor 1930 may refrain from telemetering data until these or other values fall outside an expected range.

Software, hardware, firmware, or any combination thereof can generate impedance spectra, perform fluid identification, or detect contamination based on impedance spectra.

Impedance measurements can be captured any number of times throughout the lifetime of a well when the VCO 1932 provides various series of excitation signals to the same or different electrodes 1606A-C. The VCO 1932 can use the same frequency ranges for each series of excitation signals that the VCO 1932 provides to electrodes 1606A-C. However, embodiments are not limited thereto, and the VCO 1932 can use different frequency ranges for one or more series of excitation signals. The VCO 1932, processor 1930, or other system can select the frequency range to be used for a particular series of excitation signals based on the actual or expected identity of the fluid, the amount of time that has passed since providing the previous series of excitation signals, the time since cement emplacement, the actual or expected hydration state of the fluid, or on any other factor or criterion. The frequencies to be used can be determined prior to placing fluid sensing components 1600 downhole or in other alternatives, can be communicated from surface system 38 or other system, or can be determined by a downhole processor (1930 in FIG. 19).

The VCO 1932 can excite different electrodes 1606A-C for each series of excitation signals, such that an injecting electrode injects different sets of currents to different distances into the fluid in the borehole. When a receiving electrode receives response signals responsive to each of these sets of injected currents, the processor 1930 will generate different sets of impedance spectra, each responsive to respective series of excitation signals. The processor 1930 will therefore detect changes in characteristics in the fluid, as a function of distance from electrodes 1606A-C, through comparison of the characteristics of each set of impedance spectra. Any or all of these sets of impedance spectra, or data representative of the sets of impedance spectra, can be retrieved from or stored in local or remote data storage.

The processor 1930 or surface system 38 can initiate or trigger impedance spectra generation periodically throughout a hydration or "setting" period of emplaced cement, and the processor 1930 or other circuitry can later take further measurements to monitor cement quality. The processor 1930, surface system 38, or any other system can select the amount of time that should pass between each generation of impedance spectra based on the identity of the fluid at any given time, geographical considerations, an expected hydration state of the fluid, or any other consideration or criterion. The processor 1930 can compare each set of generated impedance spectra with any other set to monitor quality, hydration state, etc.

For example, processor 1930 or surface system 38 can determine fluid identities according to the predicted or estimated fluid resistivities that have been predicted or estimated based on physical measurements, e.g., at the well site, or in a laboratory. Processor 1930 or the surface system can access or retrieve data from a lookup table that defines fluid types of fluids within the annulus based on characteristics of impedance spectra, wherein the lookup table was previously generated based on laboratory measurements or field experiments, etc., such as those described above regarding FIGS. 2-15. By comparing obtained impedance spectra characteristics with these predicted or estimated characteristics, processor 1930 can detect presence (or absence) of a particular fluid to identify what fluids are present at the location of the electrodes, which may monitor, for example, of the cementing operation (for example, to determine the TOC).

In many examples, the measurements and/or the determined impedance spectra will be telemetered to surface system 38, which may be done essentially in real time or at selected intervals. Surface system 38 can use these measurements, after placement of the cement, to identify the cure state of the cement, and also during cure or at later intervals to identify any fluid incursion of the cement barrier. In examples in which the impedance spectra are either not determined downhole or are not implemented to determine a cement cure state downhole, such operations can be performed at the surface, for example by surface system 38.

In examples of the described method, surface system 38 can receive measurements from the communication assembly over a variety of time intervals and display layer boundaries, or another fluid parameter, as a function of time or frequency.

In some embodiments, processor 1930, surface system 38, or another system can model, invert, or provide display of the measured impedances to generate resistivity data of the materials filling annulus 26 between casing 20 and formation 14. In some embodiments, processor 1930, surface system 38, or another system can model, invert, or provide display of the measured impedances acquired to generate effective medium models of the materials filling annulus 26 between casing 20 and formation 14. These effective medium models can functionally describe measured impedances in terms of physical properties such as fluid, grain size, etc. In various embodiments, surface system 38 can apply methods of model parameterization and regularization to enhance this inversion or imaging.

In some example systems, methodologies described herein may also be used to identify properties of formations 14 defining wellbore 18 in addition to, or in some examples instead of, properties of materials in annulus 26. In such methods, generation of excitation signals of a magnitude and frequency as to result in the current traversing a portion of formation 14 to reach a receiving electrode can be received and used to predict, calculate, or estimate formation 14 resistivity in the proximity of the injecting and receiving electrodes. In some cases, these determinations of formation 14 resistivity can be at least in part based upon or correlated with well logs acquired from open-hole wireline or logging-while-drilling (LWD) instruments. Surface system 38 can perform multiple deterministic-based inversions or stochastic-based inversions and subsequent post-inversion analyses that span different initial models, constraints, and regularization to quantify model uncertainty.

Figure 20:
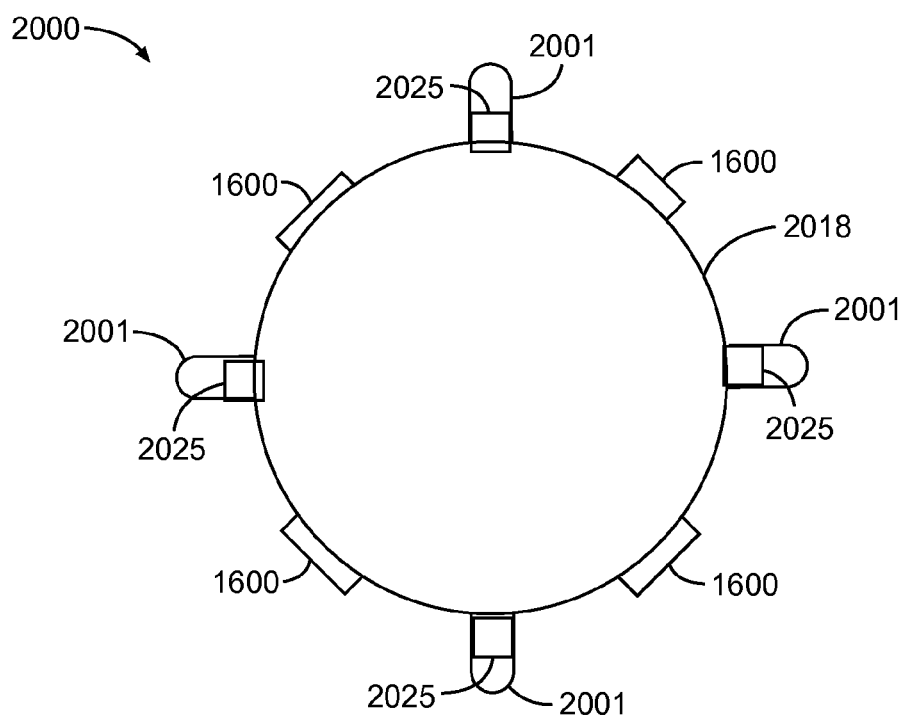
FIG. 20 depicts a cross-sectional schematic view of an example communication assembly as may be used to measure impedances in sealant (or other well servicing fluids) present within different azimuthal regions of the annulus in accordance with some embodiments.

FIG. 20 is a cross-sectional schematic view of an example communication assembly 2000 on which fluid sensing components 1600 and other components can be mounted to measure the sealant (or other well servicing fluids) present within different azimuthal regions of the annulus; or to measure or determine impedance, ion concentration, acidity, or other properties of fluids proximate communication assembly 2000 in accordance with some embodiments. Communication assembly 2000 is discussed below with reference to some elements depicted in FIG. 16.

Example communication assembly 2000 includes a plurality of ribs 2001 that extend longitudinally along communication assembly 2000 and in spaced relation to one another around the periphery of communication assembly 2000. Example communication assembly 2000 includes four ribs 2001 generally equally spaced around communication assembly 2000, and therefore generally equally spaced relative to the circumference of casing 20. As will be apparent to persons skilled in the art having the benefit of this disclosure, either a greater or a lesser number of ribs 2001 can be utilized according to needs of a particular application.

In communication assembly 2000, ribs 2001 are hollow, and house control circuitry and/or other electronics (1900 in FIG. 19), as well as additional circuitry to enable communications with an external location, etc. In many examples, ribs 2001 will be of a geometric shape that reduces or eliminates the effect of ribs 2001 on flow of fluids past or near ribs 2001. In many examples, ribs 2001 will encircle or enclose a tube 2025 or similar structure configured to house and protect control circuitry and other electronics therein from pressure, abrasion, etc. Such tubes 2025 or other structures can be include a suitable metal, such as steel, or another material suitable for the specific application, as will be apparent to persons skilled in the art having the benefit of this disclosure.

In various embodiments, communication assembly 2000 includes fluid sensing components 1600. As described herein with reference to FIGS. 16-19 and Equations (1)-(2), electrodes of fluid sensing components 1600 receives a series of excitation signals to inject a series of injection currents into the annulus 26. The injection currents can traverse the adjacent dielectric environment (i.e., the adjacent fluid) to reach one or more additional electrodes of fluid sensing components 1600.

In the depicted schematic representation, a fluid sensing component 1600 is provided between each pair of adjacent ribs 2001, such that a fluid sensing component 1600 is angularly offset from an adjacent fluid sensing component 1600, to provide impedance measurements that vary with properties of fluids passing by communication assembly 2000 in the well annulus 26. In other systems, a communication assembly may only include a single fluid sensing component 1600 proximate a given depth.

Depending on the number of fluid sensing components 1600 mounted to assembly 2000, fluid sensing components 1600 can be angularly offset from each other by a number of angular degrees, for example by about ninety degrees, about sixty degrees, etc. In the depicted example, fluid sensing components 1600 are presumed to be configured such that all electrodes of fluid sensing components 1600 are placed between ribs 2001. However, embodiments are not limited thereto and at least one electrode of a fluid sensing component 1600 can be mounted on a rib 2001 or in other configurations (as described below referring to FIG. 8). Further, in some embodiments, a fluid sensing component 1600 can be provided between one pair of adjacent ribs 2001, while a fluid sensing component 1600 may not be provided between another (or any other) pair of adjacent ribs 2001.

In some configurations, fluid sensing components 1600 can provide azimuthal information by detecting generally within a determined azimuthal region of annulus 26. In some implementations, these azimuthal regions may all be distinguished from one another, while in others the azimuthal regions may partially overlap with one another. The presence of overlap, or the degree of an overlap, if any, may depend on the number and placement of fluid sensing components 1600. Any number of ribs, tubes, or corresponding structures, may be provided as necessary to house the necessary circuitry, and as desired to provide detection within a determined azimuthal region surrounding communication assembly 2000 or to provide signaling and related processing for fluid sensing components 1600.

The various electronic circuits within each rib 2001 can communicate as desired with circuitry in another rib 2001. Such communications between can occur through use of any suitable mechanism as will be apparent to those skilled in the art, for example, through use of a serial peripheral interface (SPI), though embodiments are not limited thereto.

Communication assembly 2000 can associate with casing 20 by a variety of mechanisms. Each communication assembly includes a body member 2018 supporting other components and facilitating association with casing 20.

Figure 21:
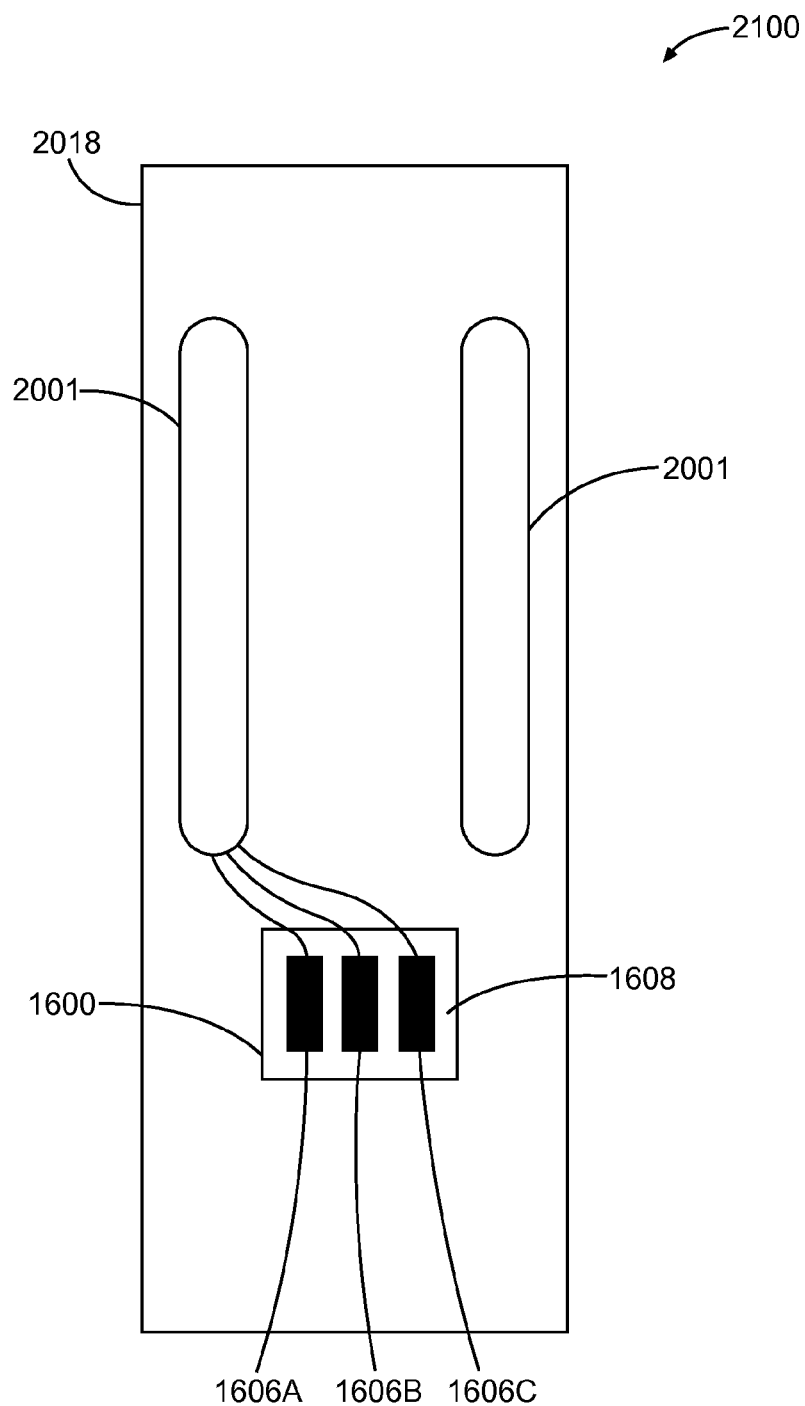
FIG. 21 depicts a side view of an example communication assembly in accordance with some embodiments.

FIG. 21 depicts a side view of a communication assembly 2100 in accordance with some embodiments. Components comparable to those discussed relative to FIGS. 15 and 20 are numbered similarly in FIG. 21.

Fluid sensing component 1600 includes a plurality of electrodes 1606A-C. Electrodes 1606A-C will be referred to as belonging to a fluid sensing component 1600 when one of the electrodes 1606A-C provides injection current received at another of the electrodes 1606A-C.

While FIG. 21 characterizes a system having three electrodes, other configurations may be used. Depending upon the specific materials of construction of various portions of a respective communication assembly, electrodes 1606A-C may be secured proximate a metallic surface, such as by being mounted on an insulating base 1608 to prevent electrical shorts against such metallic surface of the communication assemblies.

In the depicted example, communication assembly 2100 includes a plurality of electrodes 1606A-C arranged to provide a fluid sensing component 1600. Though only one side of communication assembly 2100 is shown, it should be understood that the described fluid sensing component 1600 might be replicated at a plurality of azimuthally offset locations around communication assembly 2100. Therefore, any fluid sensing component 1600 can sense fluid properties within an overlapping or non-overlapping azimuthal range of other fluid sensing components 1600 around communication assembly 820.

Persons skilled in the art having the benefit of this disclosure will recognize that the longer the spacing between an electrode 1606A-C injecting an injection current and an electrode 1606A-C configured to receive the injection current after the injection current has traversed the surrounding dielectric environment, the greater the distance the signal will extend into that environment. This effect can be further promoted with guard electrodes placed between the injecting and receiving electrodes, as known to persons skilled in the art. Additionally the longer distance allows the signals to better reflect the effects of that dielectric environment. In applications in which these effects are desired, the electrodes can be longitudinally spaced, one of above the other, along the communication assembly 2000. Electrodes 1606A-C can extend longitudinally along the assembly or laterally around the communication assembly.

As is apparent from the discussion above, in many example systems, a plurality of communication assemblies will be disposed in longitudinally spaced relation to each other along the casing 20, at least over a region of interest relative to either the sealing operation or to other downhole conditions. Accordingly, by sensing fluids of a certain type in response to detecting characteristics of impedance spectra using measured currents and voltages in accordance with Equations (1)-(4), a location, in particular TOC, can be determined by finding a location on casing 20 where below it, impedance spectra with a first characteristic of the sealant are identified, while above the location, only impedance spectra with a second characteristic associated with other fluids, for example spacer fluid or drilling mud, are identified. Furthermore, monitoring of quality of barrier, and fluid discrimination can be performed using apparatuses and methods in accordance with some embodiments.

Each communication assembly will preferably include an azimuthal indicator, for example a compass, to determine the orientation of the communication assembly once it is disposed within the borehole. With a known orientation of the communication assembly, the orientation of each rib or fluid sensing component 1600 will be known and therefore the quadrant or other azimuthally offset region being investigated will similarly be known. The depth of each casing assembly can be known, for example through a record of the location of each communication assembly as it is associated with casing 20 as the casing is placed in the wellbore, providing a measure of depth as to the surface.

In different examples, TOC measurement can be done after the pumping of the sealant is completed or the measurement can be a dynamic measurement of the TOC while the sealant is moving up annulus 26. The other measurements described herein facilitate measurements not only of the TOC, but also of the distribution of the cement or other sealant around the casing over the region of the casing string that includes associated communication assemblies. Identifying both the depth and orientation where this occurs facilitates remediation efforts.

Each communication assembly 2000 can report information associated with the fluid sensing components to a surface system, for example surface system 38, using communication methods known to those of ordinary skill in the art having benefit of this disclosure. In some examples, this may be as basic as a potential difference measurement associated with electrodes of a fluid sensing component, grouped or formatted in a manner to indicate the azimuthal orientation of the sensing.

The novel techniques described above can determine properties of sealant (or another fluid in the borehole) by generating impedance spectra based on current and voltage measurements or other measurements taken by an electrode-based fluid-sensing component. As discussed earlier, signals, for example oscillating signals, can excite electrodes of the fluid sensing component. Processors or other associated electrical systems can enhance the sensitivity of the fluid sensing component by controlling which electrodes of the fluid sensing component will inject current into fluids, and by controlling which electrodes of the fluid sensing component will sense these injected currents, to inject electric field lines to different depths into cement or contaminating fluid layers.

In summary, using the apparatus, systems, and methods disclosed herein can provide azimuthally oriented indications of various properties or conditions downhole, and in particular can provide information regarding the top of cement and the quality of the barrier in of the annulus azimuthal regions. Properties of the annular fluid can similarly be monitored azimuthally, by determining impedance spectra characteristics based on impedances sensed by electrode-based fluid sensing components to infer dielectric properties of fluids.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed is:

1. A method for characterizing fluids, comprising:
   positioning an electrode assembly within a first fluid, the electrode assembly including an injection electrode and a receiving electrode in spaced relation to one another;
   providing a first series of excitation signals at a first plurality of frequencies to the injection electrode to inject a first series of injection signals into the first fluid;
   receiving signals in response to the first series of injection signals through the receiving electrode, the received signals representative of a first impedance spectrum including impedance values representative of the first fluid;
   generating a first phase angle fingerprint based on the first impedance spectrum to characterize the first fluid according to the first phase angle fingerprint;
   at a second time, providing a second series of excitation signals at a second plurality of frequencies to the injection electrode to inject a second series of injection signals into the first fluid, wherein a frequency range to be used for the second plurality of frequencies is based on at least one of an identity of the first fluid at a first time, a time duration that has passed between the first time to the second time, and an expected hydration state of the first fluid at the second time;
   receiving second signals in response to the second series of injection signals at the receiving electrode, the received second signals being representative of a second impedance spectrum including impedance values of the first fluid; and
   identifying a characteristic of the first fluid based on the second impedance spectrum.

2. The method of claim 1, further comprising: selecting a frequency range to be used for the first plurality of frequencies based on expected properties of the first fluid.

3. The method of claim 2, further comprising:
   selecting the first fluid from a group including a cement-based fluid, a drill fluid, and a spacer fluid.

4. The method of claim 3, wherein the first series of excitation signals are provided at a first time, and wherein the method further comprises identifying a hydration state of the first fluid at the first time based on the first impedance spectrum when the first fluid is a cement-based fluid.

5. The method of claim 1, further comprising:
   disposing a layer of a second fluid over the first fluid between the first time and the second time; and
   identifying characteristics of a contaminated first fluid based on the second impedance spectrum; and
   storing characteristics of the contaminated first fluid.

6. The method of claim 5, wherein the layer of the second fluid includes one or more of water, spacer fluid, or drill fluid.

7. The method of claim 1, wherein the first fluid is a hydrated sealant material; and wherein the method further comprises selecting a time interval between the first time and the second time based on the expected hydration state of the first fluid.

8. The method of claim 1, further comprising:
   selecting a bulk resistance value from the first impedance spectrum; and
   storing the bulk resistance value and the first phase angle fingerprint such that the bulk resistance value and the first phase angle fingerprint are associated with the first fluid.

9. The method of claim 8, further comprising:
   selecting a value from the first impedance spectrum that is representative of a dielectric constant of the first fluid; and
   storing the value representative of the dielectric constant of the fluid such that the value is associated with the first fluid.

10. The method of claim 8, further comprising:
    associating a fluid sensing component with the exterior of a casing string, the casing string to be placed in a borehole in a subterranean formation to define an annulus between the casing and the subterranean formation, the fluid sensing component including a plurality of electrodes in spaced relation to one another;
    mixing a cement-based substance to form a cement slurry and, after the casing string and associated fluid sensing component are in the borehole, pumping the cement slurry down the inside of the casing string into the subterranean formation;
    providing a third series of excitation signals at a third plurality of frequencies to at least one electrode of the plurality of electrodes to inject a third series of injection signals into the cement slurry;
    receiving signals in response to the third series of injection signals through at least one other electrode of the plurality of electrodes;
    generating a second phase angle fingerprint representative of the received signals; and
    identifying a hydration state of the cement slurry based on a comparison between the second phase angle fingerprint and the first phase angle fingerprint and subsequently-stored phase angle fingerprints.

11. The method of claim 10, further comprising:
    monitoring a hydration state of the cement slurry.

12. The method of claim 1, further comprising:
    generating an expected impedance spectrum based on a circuit model of an interface between the first fluid and the electrode assembly; and
    comparing the first impedance spectrum to the expected impedance spectrum to detect contamination in the first fluid.

13. The method of claim 12, further comprising:
    selecting a frequency range to use for the first series of excitation signals based on the circuit model.

14. A system, comprising:

a frequency generator, an injection electrode and a receiving electrode, the frequency generator coupled to at least the injection electrode, one or more processors configured to control the frequency generator to provide a first series of excitation signals within a first selected frequency range to the injection electrode to propagate into a fluid, receive signals at the receiving electrode, the signals resulting from the excitation signals, evaluate the received signals to generate a first impedance spectrum representative of an impedance between the injection electrode and the receiving electrode, generate a phase angle fingerprint based on the first impedance spectrum, and evaluate the fluid through use of the phase angle fingerprint, at a second time, control the frequency generator to provide a second series of excitation signals within a second selected frequency range to the injection electrode to propagate into the fluid, wherein the second selected frequency range is based on at least one of an identity of the fluid at a first time, a time duration that has passed between the first time to the second time, and an expected hydration state of the fluid at the second time, receive second signals at the receiving electrode, the received second signals being representative of a second impedance spectrum including impedance values of the first fluid, and identifying a characteristic of the fluid based on the second impedance spectrum.

15. The system of claim 14, further comprising one or more memory devices to store data representative of the first impedance spectrum and the second impedance spectrum.

16. The system of claim 14, wherein the one or more processors are further configured to generate a Nyquist plot representative of the first impedance spectrum, and wherein the system further comprises a display to display the Nyquist plot and the phase angle fingerprint.

17. The system of claim 14, wherein the injection electrode and the receiving electrode each include a facing surface to face the other of the injection electrode and the receiving electrode.

18. The system of claim 14, wherein the frequency generator is configured to provide an input signal in a frequency range of 40 Hz to 110 MHz.

* * * * *